United States Patent
Tachibana

(10) Patent No.: US 10,845,748 B2
(45) Date of Patent: Nov. 24, 2020

(54) IMAGE FORMING APPARATUS AND CONTROL METHOD TO CHECK CONSUMABLE PART CONSUMPTION

(71) Applicant: CANON KABUSHIKI KAISHA, Tokyo (JP)

(72) Inventor: Yoshiro Tachibana, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/246,357

(22) Filed: Jan. 11, 2019

(65) Prior Publication Data

US 2019/0227475 A1    Jul. 25, 2019

(30) Foreign Application Priority Data

Jan. 22, 2018  (JP) .................................. 2018-008067

(51) Int. Cl.
*G03G 15/00* (2006.01)

(52) U.S. Cl.
CPC ....... *G03G 15/556* (2013.01); *G03G 15/5016* (2013.01)

(58) Field of Classification Search
CPC .............. G03G 15/556; G03G 15/553; G03G 15/0856; G03G 15/0863; G03G 15/5016; G03G 15/5079; G03G 15/502; G03G 2221/1663; H04N 1/2392; G06F 3/121; G06F 3/1219
USPC .................................. 399/24, 26, 31, 33, 81
See application file for complete search history.

(56) References Cited

U.S. PATENT DOCUMENTS

| 5,877,692 A * | 3/1999 | Watanabe | G03G 15/553 340/457.4 |
| 2007/0053701 A1* | 3/2007 | Nagata | G03G 15/55 399/24 |
| 2011/0242602 A1* | 10/2011 | Ikeda | G03G 15/55 358/1.15 |
| 2012/0020682 A1* | 1/2012 | Ikeda | G03G 15/55 399/24 |
| 2012/0163839 A1* | 6/2012 | Oda | G03G 15/553 399/24 |
| 2012/0213538 A1* | 8/2012 | Tomaru | G03G 15/502 399/66 |

(Continued)

FOREIGN PATENT DOCUMENTS

| JP | 08234555 A | * | 9/1996 |
| JP | 2003324570 A | * | 11/2003 |
| JP | 201311674 A | | 1/2013 |

*Primary Examiner* — Robert B Beatty
(74) *Attorney, Agent, or Firm* — Canon U.S.A., Inc. I.P. Division

(57) ABSTRACT

An image forming apparatus to perform image formation using a plurality of consumable parts includes a display unit and a display control unit. The display control unit displays, on the display unit, a first screen indicating at least a degree of consumption of a consumable part of a type in which an image forming operation stops in response to the consumable part reaching a time for replacement from among the plurality of consumable parts, and displays, on the display unit, a second screen indicating at least a degree of consumption of a consumable part of a type in which an image forming operation does not stop in response to the consumable part reaching a time for replacement from among the plurality of consumable parts.

4 Claims, 16 Drawing Sheets

(56) References Cited

U.S. PATENT DOCUMENTS

| | | | |
|---|---|---|---|
| 2012/0308245 A1* | 12/2012 | Inoue | G03G 15/553 399/24 |
| 2014/0105620 A1* | 4/2014 | Elloitt | G03G 15/556 399/24 |
| 2018/0095398 A1* | 4/2018 | Yoshida | G06K 15/4065 |
| 2018/0173147 A1* | 6/2018 | Yoshida | G03G 15/553 |

* cited by examiner

FIG.3

| CONSUMABLE PART | MODEL NUMBER NAME | DEGREE OF CONSUMPTION (%) | NUMBER OF OPERATING DAYS (DAYS) |
|---|---|---|---|
| BACK TONER CONTAINER | NPG-YYY | 100 | 0 |
| YELLOW TONER CONTAINER | NPG-YYY | 97 | 5 |
| MAGENTA TONER CONTAINER | NPG-YYY | 76 | 41 |
| CYAN TONER CONTAINER | NPG-YYY | 64 | 59 |
| RECOVERED TONER CONTAINER | WT-XXX | 10 | 371 |
| BLACK PHOTOSENSITIVE DRUM | NPG-ZZZ | 92 | 13 |
| YELLOW PHOTOSENSITIVE DRUM | NPG-ZZZ | 53 | 86 |
| MAGENTA PHOTOSENSITIVE DRUM | NPG-ZZZ | 76 | 41 |
| CYAN PHOTOSENSITIVE DRUM | NPG-ZZZ | 64 | 59 |
| FIXING UNIT | FX-XXX | 2 | 432 |
| DOCUMENT FEEDING ROLLER | DR-XXX | 117 | 0 |

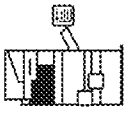

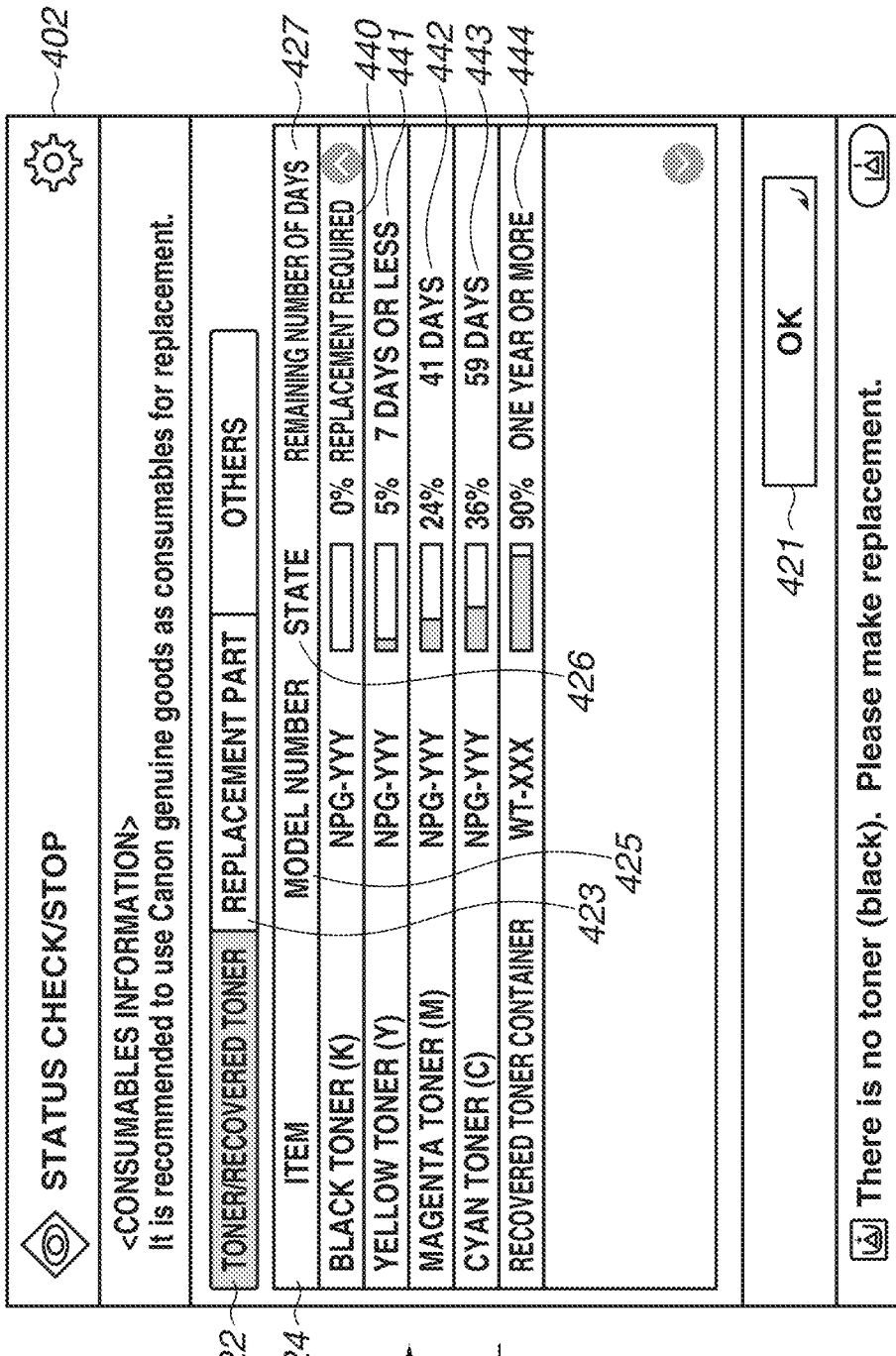

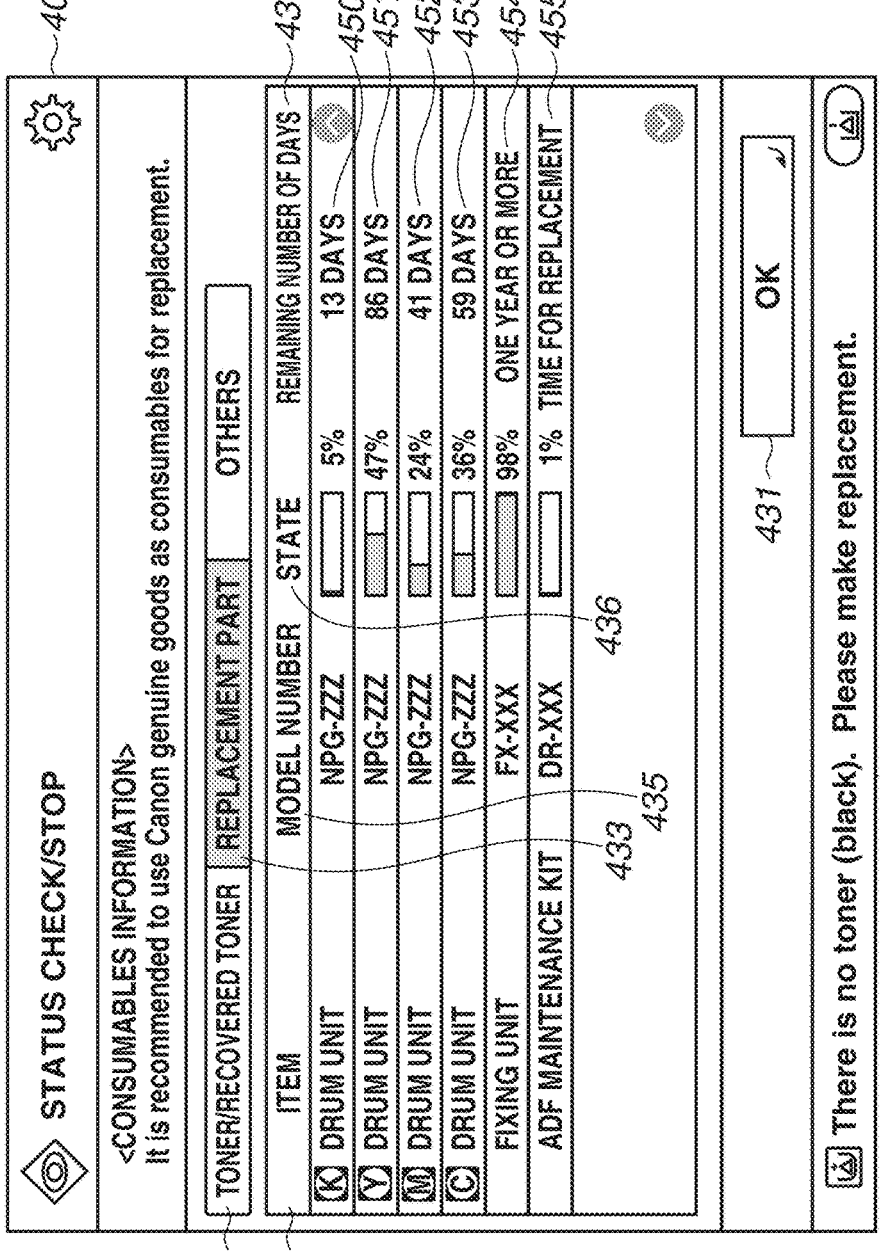

FIG.5A

※ SERVICE MODE

Select an item to be set.

| TOP |
| ENVIRONMENT SETTING |
| COMMON |
| DEVICE SETTING |

↑ UP

- TIMING OF LIFTING OF FEEDER DOCUMENT FEEDING TRAY
  ▶ AT THE TIME OF PRESSING OF START BUTTON
- RESUMPTION METHOD AT THE TIME OF OCCURRENCE OF FEEDER PAPER JAM
  ▶ FROM FIRST SHEET OF DOCUMENT
- DEFAULT SETTING OF FEEDER MULTI FEEDING DETECTION
  ▶ ON
- SILENT SETTING AT THE TIME OF DOCUMENT READING
  ▶ SPEED PRIORITY
- DISPLAY SETTING OF DEGREE OF CONSUMPTION/MODEL NUMBER CHECK SCREEN
  ▶ CHANGE NOT PERFORMED

1/2
△ ▶

CLOSE 501
510
511

→ FIG.5B

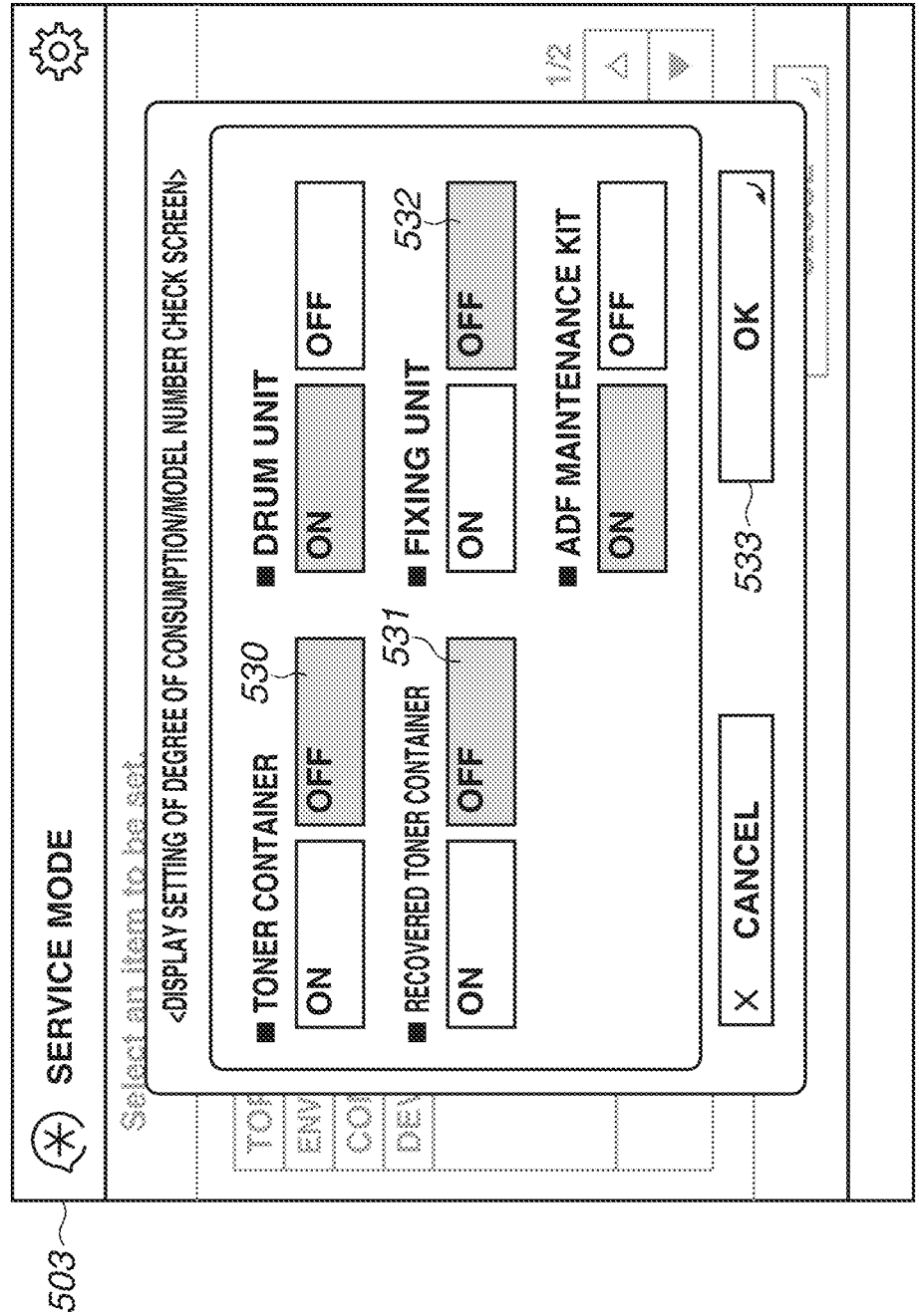

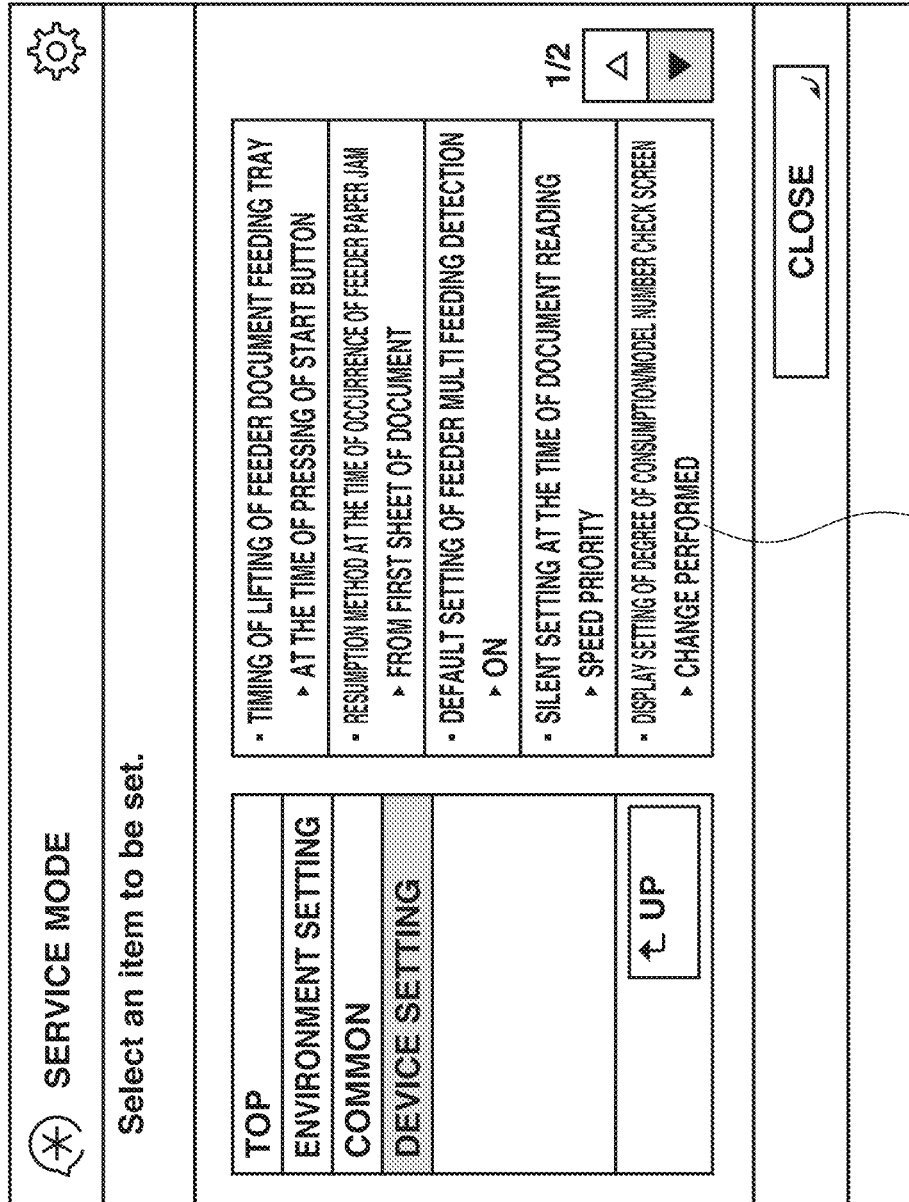

FIG.6A

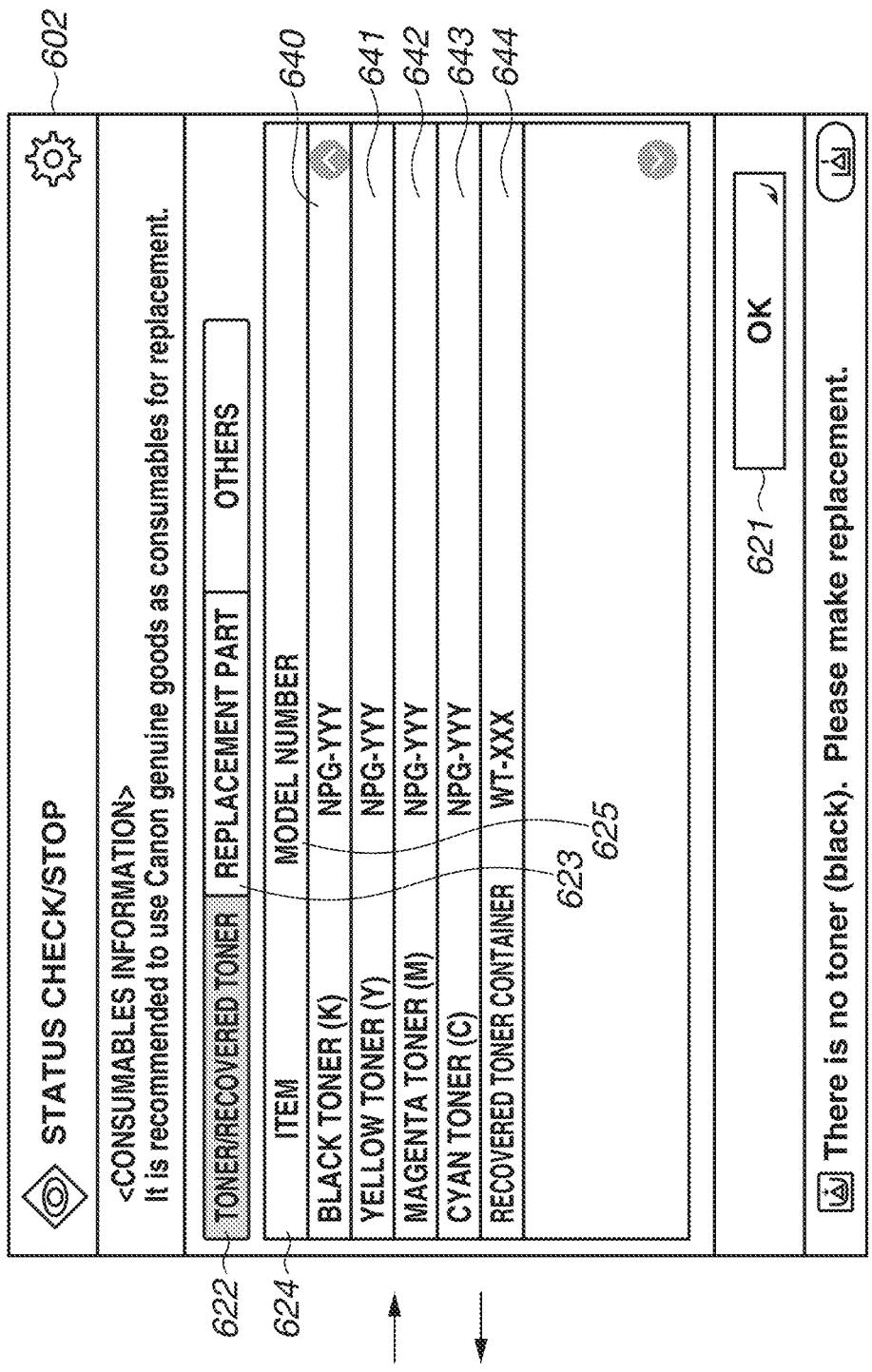

FIG.6C

STATUS CHECK/STOP

<CONSUMABLES INFORMATION>
It is recommended to use Canon genuine goods as consumables for replacement.

| TONER/RECOVERED TONER | REPLACEMENT PART | OTHERS | | |
|---|---|---|---|---|
| ITEM | MODEL NUMBER | STATE | | REMAINING NUMBER OF DAYS |
| [K] DRUM UNIT | NPG-ZZZ | ▭ 5% | | 13 DAYS |
| [Y] DRUM UNIT | NPG-ZZZ | ▬ 47% | | 86 DAYS |
| [M] DRUM UNIT | NPG-ZZZ | ▬ 24% | | 41 DAYS |
| [C] DRUM UNIT | NPG-ZZZ | ▬ 36% | | 59 DAYS |
| ADF MAINTENANCE KIT | DR-XXX | ▭ 1% | | TIME FOR REPLACEMENT |

[ OK ]

There is no toner (black). Please make replacement.

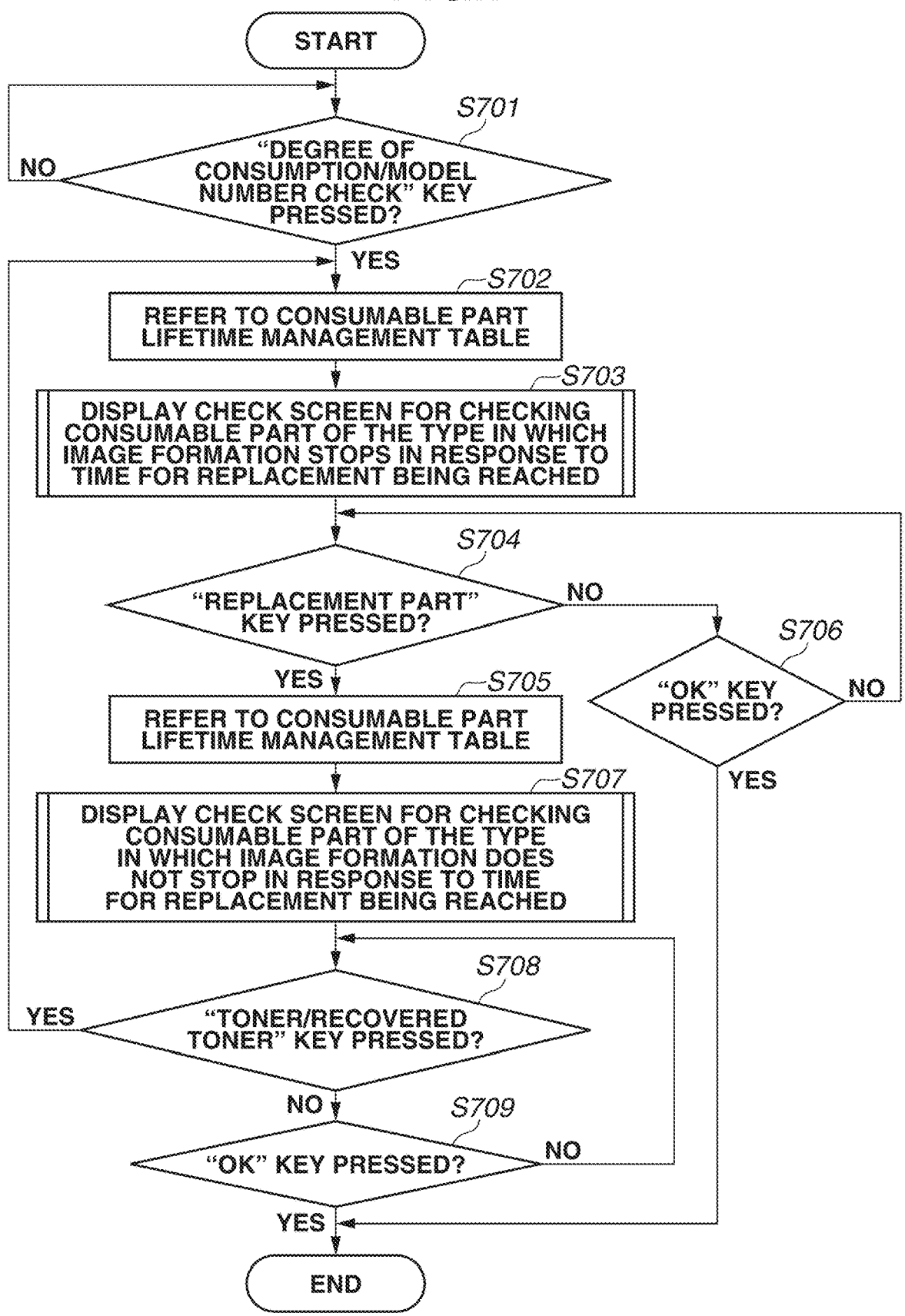

IMAGE FORMING APPARATUS AND CONTROL METHOD TO CHECK CONSUMABLE PART CONSUMPTION

BACKGROUND OF THE INVENTION

Field of the Invention

Aspects of the present disclosure generally relate to an image forming apparatus which displays a screen related to consumable parts and a control method therefor.

Description of the Related Art

Image forming apparatuses, such as printers, copying machines, and facsimile apparatuses, are each equipped with a plurality of consumable parts, which is consumed along with operations of the image forming apparatus, such as a toner container, a recovered toner container, a photosensitive drum, and a fixing unit, in a replaceable manner. These consumable parts deteriorate with age or are depleted in consumable materials contained in the containers, thus finally becoming unusable.

To maintain a good print quality in these image forming apparatuses, it is necessary for a user, a service engineer, or the like to replace each consumable part on a periodic basis. Therefore, there is a known method of, at the timing of the lifetime of a consumable part being reached, stopping an image forming operation and letting the user to know that it is necessary to replace the consumable part. Japanese Patent Application Laid-Open No. 2013-11674 discusses an image forming apparatus which calculates the lifetime of a consumable part based on a function durability amount serving as the upper limit of an operation amount, the operation amount of a consumable part taken from the time when the consumable part is attached to the present time, and the number of sheets printed or the number of operating days. Moreover, Japanese Patent Application Laid-Open Open No. 2013-11674 also discusses the mechanism of displaying a list of calculated lifetimes on an operation unit of the image forming apparatus. Specifically, Japanese Patent Application Laid-Open No. 2013-11674 discusses an image forming apparatus capable of displaying a list of consumable parts the lifetime of which has fallen below each threshold value or displaying a list of lifetimes of a plurality of consumable parts while sorting the lifetimes in ascending order.

Furthermore, consumable parts of an image forming apparatus can be classified into consumable parts of the type in which the image forming operation stops in response to the time for replacement being reached and consumable parts of the type in which the image forming operation does not stop in response to the time for replacement being reached. For example, a containing portion which contains toner for use in image formation (also called a toner container) and a recovered toner container used to recover used waste toner are the consumable parts of the type in which the image forming operation stops in response to the time for replacement being reached. Moreover, for example, a photosensitive drum and a fixing unit are the consumable parts of the type in which the image forming operation does not stop in response to the time for replacement being reached.

SUMMARY OF THE INVENTION

When a consumable part of the type in which the image forming operation stops in response to the time for replacement being reached has reached the lifetime thereof, the image forming apparatus enters a state in which image formation is not able to be performed until the consumable part is replaced. Accordingly, it can be considered that there is a high possibility of the user desiring to preferentially check a degree of consumption of the consumable part of the type in which the image forming operation stops in response to the time for replacement being reached from among a plurality of consumable parts. On the other hand, even when a consumable part of the type in which the image forming operation does not stop in response to the time for replacement being reached has reached the time for replacement, for a little while, the image forming apparatus does not enter a state in which image formation is not able to be performed. In other words, it can be considered that the necessity of checking is low for the user with respect to the degree of consumption of a consumable part of the type in which the image forming operation does not stop in response to the time for replacement being reached from among a plurality of consumable parts as compared with the consumable part of the type in which the image forming operation stops in response to the time for replacement being reached.

The present disclosure has been made in view of at least one of the above-mentioned issues. An aspect of the present disclosure is directed to providing a mechanism of, when displaying information related to consumable parts, displaying information about a consumable part of the type in which an image forming operation stops in response to a time for replacement being reached in preference to information about a consumable part of the type in which an image forming operation does not stop in response to a time for replacement being reached. Moreover, another aspect of the present disclosure is directed to providing a mechanism of, when displaying information related to consumable parts, performing display control which is high in convenience for users.

According to an aspect of the present disclosure, an image forming apparatus configured to perform image formation using a plurality of consumable parts includes a display unit, and a display control unit configured to display, on the display unit, a first screen indicating at least a degree of consumption of a consumable part of a type in which an image forming operation stops in response to the consumable part reaching a time for replacement from among the plurality of consumable parts, and to display, on the display unit, a second screen indicating at least a degree of consumption of a consumable part of a type in which an image forming operation does not stop in response to the consumable part reaching a time for replacement from among the plurality of consumable parts.

Further features of the present disclosure will become apparent from the following description of embodiments with reference to the attached drawings.

BRIEF DESCRIPTION OF THE DRAWINGS

FIG. 3 is a diagram used to explain lifetime management of consumable parts.

FIGS. 4A, 4B, and 4C are diagrams illustrating examples of screens each of which is displayed on an operation unit of the image forming apparatus.

FIGS. 5A, 5B, 5C, and 5D are diagrams illustrating examples of screens each of which is displayed on the operation unit of the image forming apparatus.

FIGS. 6A, 6B, and 6C are diagrams illustrating examples of screens each of which is displayed on the operation unit of the image forming apparatus.

FIG. 7 is a flowchart illustrating an example of display control in the image forming apparatus.

DESCRIPTION OF THE EMBODIMENTS

Various embodiments, features, and aspects of the disclosure will be described in detail below with reference to the drawings. Furthermore, the following embodiments are not intended to limit the scope of the present disclosure defined in the claims, and not all of the combinations of features described in the embodiments are necessarily essential for resolutions in the present disclosure.

Figure 1:
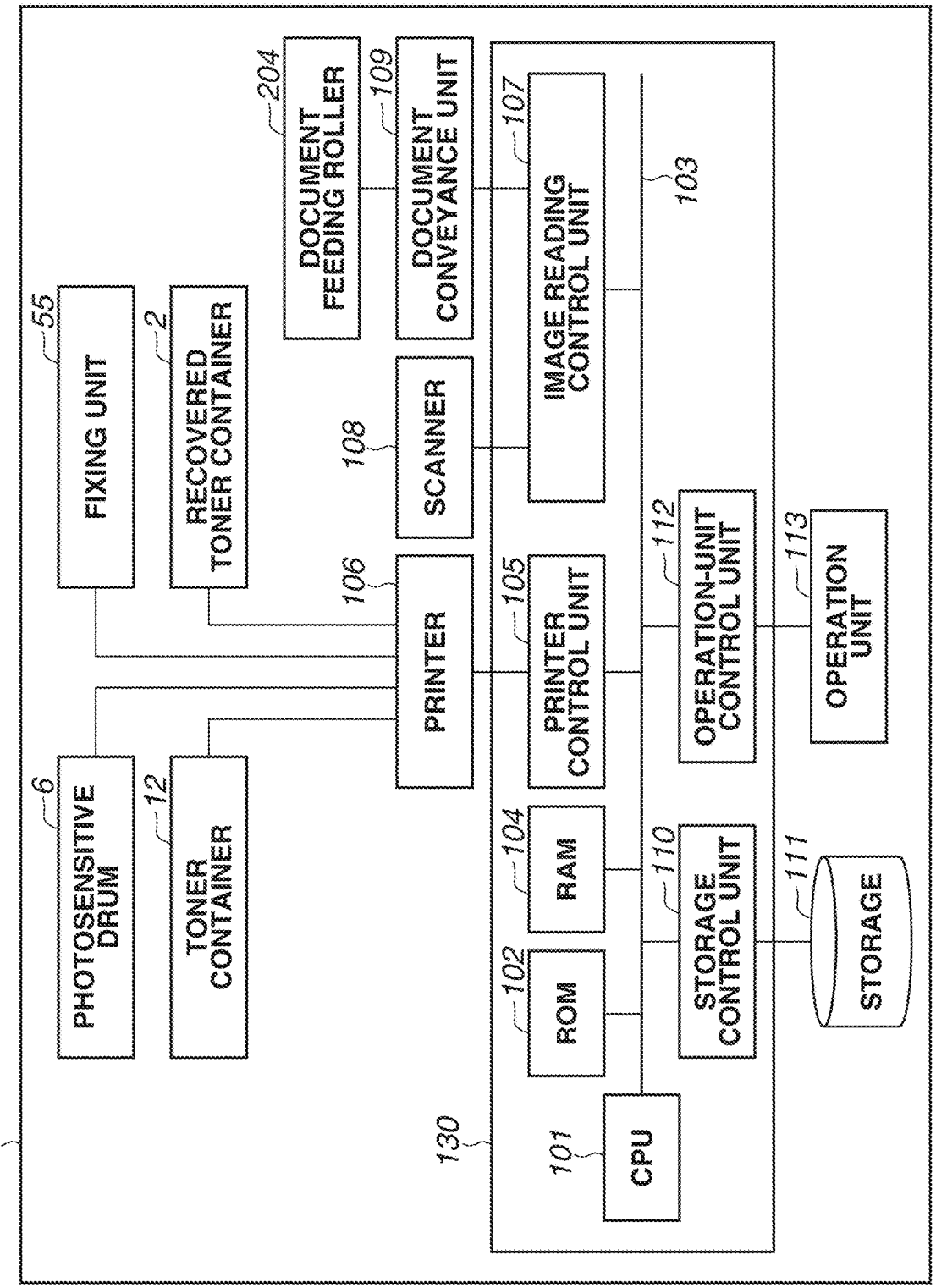
FIG. 1 is a block diagram illustrating an example of a hardware configuration of an image forming apparatus.

FIG. 1 is a block diagram illustrating an example of a hardware configuration of an image forming apparatus 100 according to an embodiment of the present disclosure. Referring to FIG. 1, the image forming apparatus 100 includes a controller 130, which includes a central processing unit (CPU) 101. The controller 130 further includes a read-only memory (ROM) 102, a random access memory (RAM) 104, a printer control unit 105, an image reading control unit 107, a storage control unit 110, and an operation-unit control unit 112. Various units constituting the controller 130 are interconnected by a bus 103. Moreover, the image forming apparatus 100 further includes pieces of hardware, such as a storage 111, a printer 106, a scanner 108, a document conveyance unit 109, and an operation unit 113. The printer control unit 105, the image reading control unit 107, the storage control unit 110, and the operation-unit control unit 112 of the controller 130 function as interfaces used for the CPU 101 to control the respective pieces of hardware.

The image forming apparatus 100 is configured in such a manner that a great number of consumable parts are able to be replaced by, for example, a user or a service engineer. For example, in the printer 106, for example, a toner container 12, a recovered toner container 2, a photosensitive drum 6, and a fixing unit 55 are replaceable consumable parts, and are mounted in such a way as to be detachable from the printer 106. Moreover, in the document conveyance unit 109, for example, a document feeding roller 204 is a consumable part which is replaceable by the user, and is mounted in such a way as to be detachable from the document conveyance unit 109.

Furthermore, while, in the present embodiment, these consumable parts are described as consumable parts which are replaceable by the user, the present embodiment is not limited to this. Some of the consumable parts can be consumable parts which are to be replaced by a service engineer.

The controller 130, including the CPU 101, controls the entire image forming apparatus 100. The CPU 101 activates an operating system (OS) using a boot program stored in the ROM 102. Then, the CPU 101 executes, on the OS, control programs stored in the storage 111 and the ROM 102.

The RAM 104 is used as a temporary storage region, such as a main memory or a work area, for the CPU 101. The storage 111 is a readable and writable non-volatile storage device such as a hard disk drive (HDD). The storage 111 has stored therein various pieces of data and programs, such as a program for controlling the entire image forming apparatus 100, various types of application programs, image data, degrees of consumption of consumable parts, and data indicating the number of operating days. The CPU 101 accesses the storage 111 via the storage control unit 110.

The CPU 101 controls the image forming apparatus 100 by executing the control program and the application programs read out from the storage 111 and the ROM 102 and loaded onto the RAM 104. In this way, pieces of hardware, such as the CPU 101, the ROM 102, the RAM 104, and the storage 111, which constitute the controller 130, constitute what is called a computer.

Furthermore, while, in the image forming apparatus 100 according to the present embodiment, a single CPU 101 performs each processing operation illustrated in a flowchart described below using a program loaded onto a single memory (RAM 104), a different configuration can also be employed. For example, a plurality of processors, a plurality of RAMS, a plurality of ROMs, and a plurality of storages can be configured to cooperate with each other to perform each processing operation illustrated in a flowchart described below. Moreover, a configuration in which some processing operations are performed with use of a hardware circuit, such as an application specific integrated circuit (ASIC) or a field-programmable gate array (FPGA) can be employed.

The CPU 101 controls the scanner 108 via the image reading control unit 107 to read an image on a document, thus generating image data. Moreover, the CPU 101 is also able to control the document conveyance unit 109, which includes an auto document feeder (ADF), to convey a document placed on the document positioning plate of the document conveyance unit 109 to the scanner 108 on a sheet-by-sheet basis, thus generating image data. The scanner 108 performs scanning of a document with use of an optical reading device, such as a charge-coupled device (CCD) sensor, to convert image information about the document into electrical signal data. Image data obtained by reading an image on a document is stored in the storage 111 and is then used for print processing described below or the like.

The CPU 101 forms an image on a sheet of, for example, paper in cooperation with the printer control unit 105 and the printer 106.

The operation-unit control unit 112 interconnects the operation unit 113 and the controller 130. The operation unit 113 functions as a display unit which displays information to the user and a reception unit which receives an instruction from the user. The operation unit 113 is equipped with a touch panel display which displays an operation screen displayed below and receives an input from the user. Moreover, the operation unit 113 can be configured to include hardware keys, such as a start key and a status check/stop key which is used to check the status of the image forming apparatus 100 or make a transition to a status screen for stopping a job.

Figure 2:
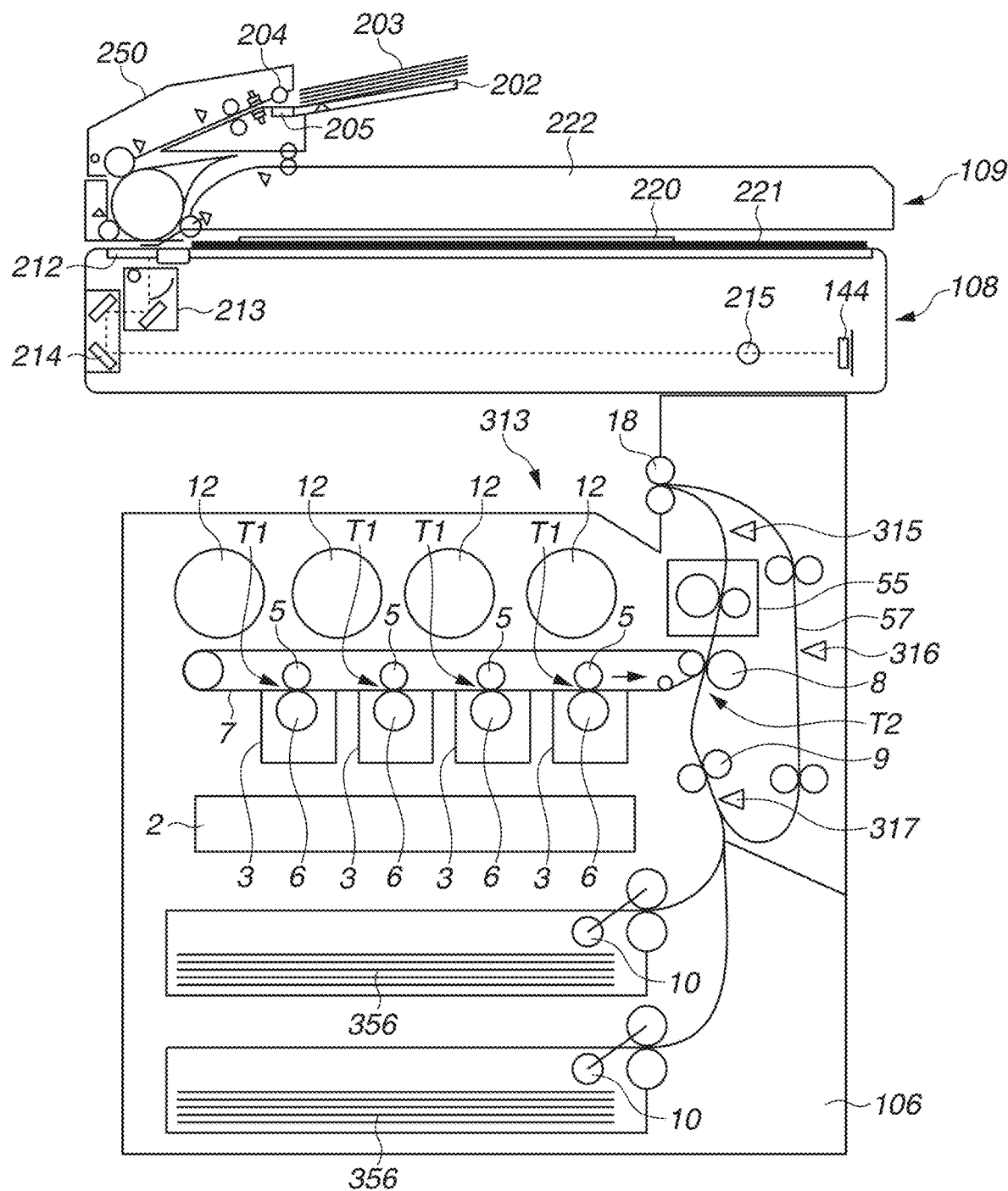
FIG. 2 is an example of a sectional view of the image forming apparatus.
Figure 5B:
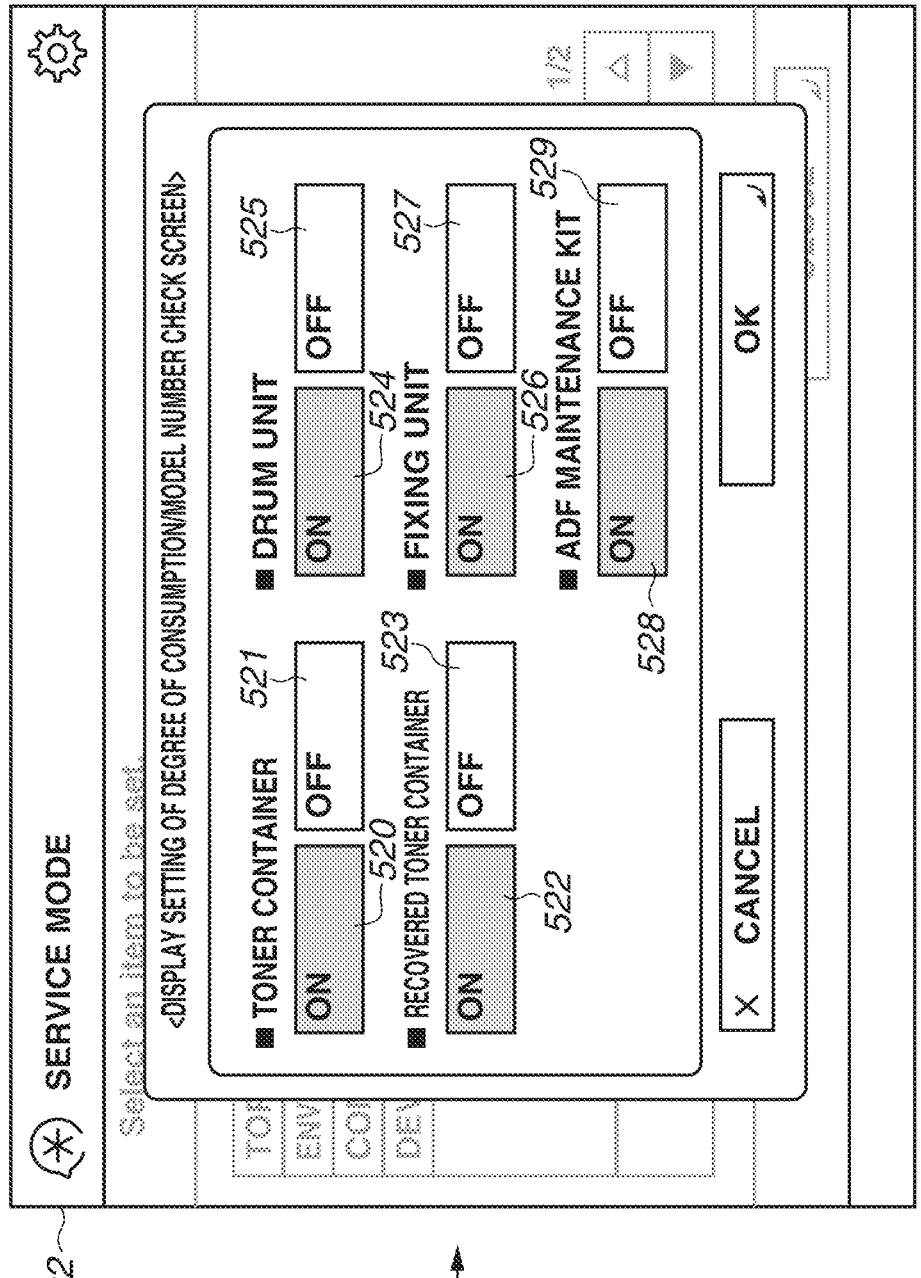

Next, image forming processing and reading processing which are performed in the image forming apparatus 100 are described with reference to FIG. 2. FIG. 2 is a diagram illustrating an example of a sectional view of the image forming apparatus 100.

FIG. 2 illustrates an example of a full-color image forming apparatus for colors, such as yellow, magenta, cyan, and black. Moreover, the image forming apparatus is of what is called a tandem type in which four photosensitive drums 6 serving as image bearing members which respectively bear toner images of the respective colors, yellow, magenta, cyan, and black, are arranged side by side along the traveling direction of an intermediate transfer belt 7 serving as an intermediate transfer member. The image forming apparatus includes a scanner 108, a document conveyance unit 109, and a printer 106.

One sheet of document is separated from a document bundle 203 stacked on a stacking portion 202 by a frictional force acting between a document feeding roller 204 and a separation pad 205. The separated sheet of document is conveyed into a conveyance path. Then, the document conveyed on a sheet-by-sheet basis is transported to a reading position via the conveyance path. Then, the document conveyed through the conveyance path while being in contact with a document glass 212 is further conveyed by various rollers and is then discharged to a discharge tray 222. The CPU 101 is assumed to implement such conveyance processing in cooperation with the document conveyance unit 109.

In the present embodiment, in view of a case where the document feeding roller 204 wears due to the influence of a frictional force and thus influences separation of a document bundle, the document feeding roller 204 is configured as a consumable part that is able to be replaced by the user. Furthermore, the present embodiment is not limited to this configuration, and a pair of the document feeding roller 204 and the separation pad 205 can be configured as a consumable part that is able to be replaced by the user. Hereinafter, in the present embodiment, a consumable part that is able to be replaced by the user in the document conveyance unit 109 is referred to as an "ADF maintenance kit".

Next, generation of image data is described. At the timing when the document passes through on the document glass 212, the document, which is in contact with the document glass 212, is exposed to light by an optical unit 213. As a result, reflected light from the document is transmitted toward a lens 215 via a mirror unit 214. Then, the transmitted reflected light passes through the lens 215, thus being condensed, and is made incident on a CCD sensor 144. The CCD sensor 144 converts the incident light into a digital signal. The digital signal obtained by conversion performed by the CCD sensor 144 is then converted into image data, which is then transferred to the storage 111.

Moreover, the scanner 108 is able to read a document 220 placed on a platen glass 221 (a document positioning plate). In this case, image data for one page is acquired by, without conveying the document, performing scanning on the document placed on the platen glass 221 while moving the optical unit 213 with a motor.

A cover 250, which covers a part of the conveyance path of the document conveyance unit 109, is configured to be operable and closable. The user can open the cover 250 to perform, for example, a replacement work for the ADF maintenance kit.

Next, image forming processing which is performed by the printer 106 is described. The printer 106 includes a mounting portion in which toner containers (storage containers) 12 containing toners of the respective colors are mounted and a mounting portion in which drum cartridges 3 including photosensitive drums 6 of the respective colors are mounted. Moreover, the printer 106 further includes exposure units (omitted from illustration), which are configured to irradiate the photosensitive drums 6 of the respective colors with laser beams, and an intermediate transfer belt 7. Moreover, the printer 106 further includes, for example, a mounting portion in which primary transfer rollers 5 serving as a primary transfer unit, a secondary transfer roller 8 serving as a secondary transfer unit, and a fixing unit 55 are mounted.

Each drum cartridge 3 including the photosensitive drum 6 includes the photosensitive drum 6 and a charging unit, a developing unit, and a cleaner (each omitted from illustration) arranged around the photosensitive drum 6. The drum cartridge 3 is replenished with toner from the toner container 12 via a path (omitted from illustration).

The intermediate transfer belt 7 is stretched by a plurality of tension rollers, is located adjacent to the drum cartridges 3, and is in contact with each photosensitive drum 6. Such an intermediate transfer belt 7 is traveled in the direction of an arrow illustrated in FIG. 2 by any one roller (a driving roller) of a plurality of tension rollers connected to a motor (omitted from illustration) being rotationally driven. The primary transfer rollers 5 are arranged at positions facing the respective photosensitive drums 6 across the intermediate transfer belt 7. Moreover, at the downstream side of the drum cartridges 3 with regard to the traveling direction of the intermediate transfer belt 7, a secondary transfer roller 8 is located in such a way as to be in contact with the intermediate transfer belt 7, so that a secondary transfer portion T2 is formed by the secondary transfer roller 8 and the intermediate transfer belt 7. The exposure units (omitted from illustration) are arranged at the side of the drum cartridges 3 opposite to the intermediate transfer belt 7, and irradiate the respective photosensitive drums 6 with laser beams based on an image serving as a print target.

The fixing unit 55 is located at the downstream side of the secondary transfer portion T2, and heats and presses a recording material having a toner image borne thereon, thus fixing the toner image to the recording material. Moreover, the printer 106, which includes a plurality of cassettes 356 containing sheets, picks up a sheet from one of the cassettes 356, conveys the sheet to the secondary transfer portion T2 and the fixing unit 55, and then discharges the sheet subjected to fixing to a sheet discharge port 313. Moreover, the printer 106 also includes a reversing conveyance mechanism 57, which reverses a sheet to be conveyed to perform two-sided printing.

Next, an image forming process which is implemented by various units operating in cooperation with each other is specifically described. First, the surfaces of the photosensitive drums 6 of the respective colors are electrically charged by the charging units, and are then exposed to light by the exposure units (omitted from illustration). Latent images are formed on the respective photosensitive drums 6 by exposure performed by the exposure units. The latent images are developed by the respective developing units, so that toner images are formed on the respective photosensitive drums 6. The toner image formed on the photosensitive drum 6 arrives at a primary transfer portion T1, at which the photosensitive drum 6 and the intermediate transfer belt 7 are in contact with each other. Then, at the primary transfer portion T1, a primary transfer bias is applied to the primary transfer roller 5, so that the toner images on the respective photosensitive drums 6 are sequentially transferred to the intermediate transfer belt 7 and a full-color toner image is thus formed on the intermediate transfer belt 7. The full-color toner image is conveyed to the secondary transfer portion T2 by the intermediate transfer belt 7 traveling.

On the other hand, a sheet supplied from the cassette 356 is conveyed toward the secondary transfer portion T2. More specifically, a sheet is sent out by the pickup roller 10 from the cassette 356 on a sheet-by-sheet basis, is adjusted by a registration roller 9 to coincide in timing with a toner image on the intermediate transfer belt 7, and is then conveyed to the secondary transfer portion T2. Then, at the secondary transfer portion T2, a secondary transfer bias is applied to the secondary transfer roller 8, so that the toner image on the intermediate transfer belt 7 is secondarily transferred to the sheet. After that, the sheet having the toner image transferred thereto is conveyed to the fixing unit 55 and is then subjected to heat and pressure there, so that toner is fused and mixed in color and the toner image is fixed to the sheet as a print image. The sheet having an image fixed thereto is discharged to the sheet discharge port 313 by a discharge roller 18 provided at the downstream side of the fixing unit 55 with the print side of the sheet facing downward.

Moreover, toner remaining on the surface of the photosensitive drum 6 after the transfer process (transfer remaining toner) is removed from the surface of the photosensitive drum 6 by a cleaner and is then recovered into the recovered toner container 2.

A sheet discharge sensor 315, a two-sided conveyance sensor 316, and a pre-registration sensor 317 are sensors which detect the presence or absence of stagnation of print sheets and are used to, for example, detect the occurrence of jam.

<Management of Lifetimes of Consumable Parts>

Lifetimes of consumable parts, such as the toner container 12, the recovered toner container 2, the photosensitive drum 6, the fixing unit 55, and the document feeding roller 204, are managed as appropriate. In the present embodiment, as the lifetimes of consumable parts, information indicating the degree of consumption (also referred to as the "consumption degree") and the remaining number of operating days indicating a remaining period in which the consumable part is usable (also referred to as the "remaining number of days") are managed.

First, the degree of consumption is described. For example, the degree of consumption of the toner container 12 is derived based on operation results of the consumable part, such as the number of times of supplementation of toner to the corresponding toner cartridge 3 and the detection of the remaining amount of toner by a sensor (omitted from illustration). Moreover, to derive the degree of consumption, in addition to the operation results, for example, dot counting for counting, for example, the number of colored dots of an image to be printed can be taken into consideration. Moreover, the degrees of consumption of, for example, the recovered toner container 2, the photosensitive drum 6, the fixing unit 55, and the document feeding roller 204 are calculated based on operation results such as the number of passing sheets and the travel distance.

Next, estimating the remaining number of operating days is described. The remaining number of operating days is estimated based on, for example, the degree of consumption of each consumable part and the number of operating days of each consumable part. For example, the CPU 101 calculates an average amount of consumption per day based on, for example, the degree of consumption of each consumable part and the number of operating days of each consumable part. Then, the CPU 101 is able to calculate an estimate value indicating the remaining number of operating days based on the current degree of consumption of each consumable part and the calculated average amount of consumption. Furthermore, the method of calculating an estimate value indicating the remaining number of operating days is not limited to this, and a configuration in which an estimate value indicating the remaining number of operating days is calculated with use of, for example, multiple regression analysis can also be employed. Moreover, for example, machine learning using data about various operation results as input data can be performed to structure a learning model (also referred to as "training") and an estimate value indicating the remaining number of operating days can be inferred with use of the learning model. Furthermore, processing for structuring a learning model or processing for inferring an estimate value can be performed by the CPU 101 in cooperation with a cloud server (omitted from illustration).

The degree of consumption of each consumable part and the remaining number of operating days of each consumable part obtained in the above-mentioned calculation or inference are then stored in the storage 111. In the present embodiment, a display function of displaying, on the operation unit 113, information that is based on the degree of consumption and the remaining number of operating days obtained in the above-mentioned calculation or inference is provided.

Here, various consumable parts which are mounted in the image forming apparatus 100 can be classified into consumable parts of the type in which the image forming operation stops in response to the time for replacement being reached and consumable parts of the type in which the image forming operation does not stop in response to the time for replacement being reached. Specifically, the toner container 12, which contains toner to be used for image formation, and the recovered toner container 2 are consumable parts of the type in which the image forming operation stops in response to the time for replacement being reached. When the time for replacement is reached, these consumable parts have a great effect on the print quality. Accordingly, in response to the consumable part reaching the time for replacement, the image forming apparatus 100 transitions to a state of not performing the image forming operation and displays a screen for prompting the user to replace the consumable part.

On the other hand, for example, the photosensitive drum 6 and the fixing unit 55 are consumable parts of the type in which the image forming operation does not stop in response to the time for replacement being reached. These consumable parts are consumable parts the performance of which is gradually lowered by operations thereof, and, even if the time for replacement is reached, these consumable parts do not have a great effect on the print quality, as compared with the above-mentioned toner container 12 or recovered toner container 2.

Here, when a consumable part of the type in which the image forming operation stops in response to the time for replacement being reached has reached the lifetime thereof, the image forming apparatus enters a state in which image formation is not able to be performed until the consumable part is replaced. Accordingly, it can be considered that there is a high possibility of the user desiring to preferentially check a degree of consumption of the consumable part of the type in which the image forming operation stops in response to the time for replacement being reached from among a plurality of consumable parts. On the other hand, even when a consumable part of the type in which the image forming operation does not stop in response to the time for replacement being reached has reached the time for replacement, for a little while, the image forming apparatus does not enter a state in which image formation is not able to be performed. In other words, it can be considered that the necessity of checking is low for the user with respect to the degree of consumption of a consumable part of the type in which the image forming operation does not stop in response to the time for replacement being reached from among a plurality of consumable parts as compared with the consumable part of the type in which the image forming operation stops in response to the time for replacement being reached.

In view of at least one of the above-mentioned issues, the present embodiment provides a function of displaying information about a consumable part of the type in which the image forming operation stops in response to the time for replacement being reached in preference to information about a consumable part of the type in which the image forming operation does not stop in response to the time for replacement being reached. Moreover, the present embodiment provides a mechanism of, when displaying information related to consumable parts, performing display control which is high in convenience for users.

First, management of the degree of consumption and the remaining number of operating days of each consumable part is described with reference to FIG. 3. FIG. 3 is a diagram illustrating a consumable part lifetime management table 120 stored in the storage 111 illustrated in FIG. 1. As illustrated in FIG. 3, the consumable part lifetime management table 120 is a table in which the association between consumable parts which are replaceable by the user or service engineer and the lifetimes of the consumable parts is stored. The consumable part lifetime management table 120 has a consumable part 121, a model number name 122, the degree of consumption 123, and the remaining number of operating days 124 stored in association with each other.

Referring to FIG. 3, in the consumable part lifetime management table 120, information about, as the consumable part 121, for example, toner containers of the respective colors, a recovered toner container, photosensitive drums of the respective colors, a fixing unit, and a document feeding roller is stored. The model number name 122 is identification information for identifying consumable parts which are mounted in different types of image forming apparatuses, such as high-speed machines and low-speed machines, and is used for the user to order consumable parts. The degree of consumption 123 is the degree of consumption calculated at the present time after a predetermined consumable part is mounted in the image forming apparatus 100, and is updated along with the above-mentioned calculation processing. Moreover, the remaining number of operating days 124 is the remaining number of operating days until the end of the lifetime of a predetermined consumable part is reached, and is updated along with the above-mentioned estimation processing. Furthermore, while, in the present embodiment, a table is taken as an example of a data structure used to store the association between consumable parts and lifetimes of the consumable parts, the present embodiment is not limited to this, and another data structure can be employed for storage.

As illustrated in FIG. 3, the degrees of consumption and the remaining numbers of operating days corresponding to the toner containers 12 of the respective colors are stored. In response to the degree of consumption of any one of the toner containers 12 of the respective colors reaching 100%, the CPU 101 stops a printing operation which is performed by the printer 106. Similarly, the degree of consumption and the remaining number of operating days corresponding to the recovered toner container 2 are stored in the storage 111, and, in response to the degree of consumption thereof reaching 100%, the CPU 101 stops a printing operation which is performed by the printer 106. For example, FIG. 3 illustrates a case where the degree of consumption 123 of the toner container 12 of black has reached 100%. In this case, the image forming apparatus 100 stops a printing operation and waits for the toner container 12 of black to be replaced.

On the other hand, in response to any one of the degrees of consumption corresponding to the photosensitive drums 6 of the respective colors reaching 100%, the CPU 101 does not stop a printing operation which is performed by the printer 106. Similarly, in response to the degree of consumption corresponding to the fixing unit 55 reaching 100%, the CPU 101 does not stop a printing operation which is performed by the printer 106. Moreover, in response to the degree of consumption corresponding to the document feeding roller 204 reaching 100%, the CPU 101 does not stop a reading operation which is performed by the scanner 108 and the document conveyance unit 109.

For example, referring to FIG. 3, the degree of consumption 123 of the document feeding roller 204 has reached 117%, thus having come up for the time for replacement. However, since the document feeding roller 204 is a consumable part of the type in which the image forming operation does not stop in response to the time for replacement being reached, the CPU 101 performs control in such a manner that the consumable part does not stop the reading operation.

Next, a screen related to consumable parts, which is displayed on the operation unit 113, is described. FIGS. 4A, 4B, and 4C, FIGS. 5A, 5B, 5C, and 5D, and FIGS. 6A, 6B, and 6C are diagrams illustrating examples of screens each of which is displayed on the operation unit 113 in the present embodiment. Hereinafter, a complete view of transitions of display screens in the present embodiment is described with reference to FIGS. 4A to 4C to FIGS. 6A to 6C. Furthermore, the screens illustrated in FIGS. 4A to 4C to FIGS. 6A to 6C are examples of screens each of which is displayed on the operation unit 113 based on display data generated by the CPU 101 executing a program stored in the storage 111.

First, with reference to FIGS. 4A to 4C, specific control which is performed in the case of displaying lifetimes of consumable parts of the type in which the image forming operation stops in response to the time for replacement being reached and consumable parts of the type in which the image forming operation does not stop in response to the time for replacement being reached is described.

FIGS. 4A to 4C illustrate a transition example of screens for displaying lifetimes of consumable parts, each of which is displayed on the operation unit 113. The screen 401 represents an example of a status check/stop screen. The screen 402 represents an example of a screen for displaying lifetimes of consumable parts of the type in which the image forming operation stops in response to the time for replacement being reached. The screen 403 represents an example of a screen for displaying lifetimes of consumable parts of the type in which the image forming operation does not stop in response to the time for replacement being reached.

As indicated in each screen illustrated in FIGS. 4A to 4C, a screen composed of a main display area and a status display area 414 is displayed on the operation unit 113. The status display area 414 is an area in which to display a message corresponding to a maintenance event occurring in the image forming apparatus 100. In a case where a plurality of maintenance events is occurring, messages corresponding to the respective maintenance events are alternately displayed in the status display area 414. In FIGS. 4A to 4C, a case where the message "There is no toner (black). Please make replacement." is displayed is illustrated as an example.

When detecting that the status check key (omitted from illustration) has been pressed by the user, the CPU 101 displays the status check/stop screen 401 on the operation unit 113. In the status check/stop screen 401, values indicating sizes and types of paper sheets stored in the cassettes 356 are displayed as paper information 412. Moreover, in an area 413, information indicating the usage status of a memory, an indicator for easily checking the lifetime of each consumable part, and the percent indicating each lifetime are displayed. These lifetimes are configured to be displayed in eleven levels in view of the size of a display area. For example, while, as illustrated in FIG. 3, the degree of consumption of the magenta toner container is 76% and the remaining lifetime thereof is 24%, the percent indicating the lifetime is rounded up and displayed as 30%.

Moreover, the degree of consumption/model number check key 411 is a key used to make a transition to a screen for displaying lifetimes of consumable parts of the type in which the image forming operation stops in response to the time for replacement being reached. When detecting that the degree of consumption/model number check key 411 has been pressed, the CPU 101 displays a toner/recovered toner degree of consumption/model number check screen 402 on the operation unit 113.

In the toner/recovered toner degree of consumption/ model number check screen 402, an OK key 421, an item display field 424, a model number display field 425, a state display field 426, and a remaining number of days display field 427 are displayed, and the OK key 421 is a key used to make a transition to the status check/stop screen 401. In the present embodiment, with regard to the remaining number of days display field 427, not only a value indicating the remaining number of operating days is simply displayed but also an indication which is likely to be intuitively known by the user is displayed. Specifically, in a case where the estimate of the remaining number of operating days exceeds 364 days, the indication is rounded and displayed as "one year and more". This display control is performed in such a way as to consciously narrow down the amount of information about a consumable part which remains unreplaced for a while, thus letting the user to intuitively know that the consumable part will remain unreplaced for a while. Here, while "364 days" is used as a threshold value as an example, the present embodiment is not limited to this. For example, half a year can be used as a threshold value. In this case, if the remaining number of operating days of a consumable part exceeds half a year, for example, the indication can be displayed as "half a year or more".

Moreover, in a case where the estimate of the remaining number of operating days falls below 8 days, the indication is rounded and displayed as "7 days or less". This display control is performed in order to prevent the user from replacing a consumable part which is still usable on the way. Moreover, when the estimate of the remaining number of operating days reaches zero days, the indication is displayed as "replacement required". These processing operations allow presenting information in a display form which is likely to be intuitively understood by the user according to the level of the remaining number of operating days.

Moreover, with regard to the state, an indicator and a percentage indicating the lifetime are configured to be displayed. However, in a case where the lifetime falls below a predetermined threshold value (for example, 5%), the lifetime is replaced by the predetermined threshold value to be displayed. This display control is performed in order to prevent the user from replacing a consumable part which is still usable on the way.

The CPU 101 refers to the consumable part lifetime management table 120 illustrated in FIG. 3 and displays display contents corresponding to the toner containers 12 of the respective colors and the recovered toner container 2 in display areas 440 to 444.

Contents in the respective display areas are described. In a display area 440, "black toner (K)", which is an item name corresponding to the black toner container 12, is displayed in an item display field 424, and "NPG-YYY", which is a model number name 122 corresponding to the black toner container 12, is displayed in a model number display field 425. Moreover, in a state display field 426, a value "0%" calculated by subtracting 100%, which is the degree of consumption 123 corresponding to the black toner container 12, from 100% and an indicator indicating the calculated value are displayed. Furthermore, in a remaining number of days display field 427, since the remaining number of operating days 124 corresponding to the black toner container 12 has reached zero days, "replacement required" is displayed.

Next, in a display area 441, "yellow toner (Y)", which is an item name corresponding to the yellow toner container 12, is displayed in the item display field 424, and "NPG-YYY", which is a model number name 122 corresponding to the yellow toner container 12, is displayed in the model number display field 425. Moreover, in the state display field 426, since a value (3%) calculated by subtracting 97%, which is the degree of consumption 123 corresponding to the yellow toner container 12, from 100% falls below 5% serving as a threshold value, "5%" is displayed, and an indicator indicating the displayed value is displayed. Furthermore, in the remaining number of days display field 427, since the value (5 days) of the remaining number of operating days 124 corresponding to the yellow toner container 12 falls below 8 days serving as a threshold value, "7 days or less" is displayed.

In a display area 442, "magenta toner (M)", which is an item name corresponding to the magenta toner container 12, is displayed in the item display field 424, and "NPG-YYY", which is a model number name 122 corresponding to the magenta toner container 12, is displayed in the model number display field 425. Moreover, in the state display field 426, a value "24%" calculated by subtracting 76%, which is the degree of consumption 123 corresponding to the magenta toner container 12, from 100% and an indicator indicating the calculated value are displayed. Furthermore, in the remaining number of days display field 427, "41 days", which is the remaining number of operating days 124 corresponding to the magenta toner container 12, is displayed.

In a display area 443, "cyan toner (C)", which is an item name corresponding to the cyan toner container 12, is displayed in the item display field 424, and "NPG-YYY", which is a model number name 122 corresponding to the cyan toner container 12, is displayed in the model number display field 425. Moreover, in the state display field 426, a value "36%" calculated by subtracting 64%, which is the degree of consumption 123 corresponding to the cyan toner container 12, from 100% and an indicator indicating the calculated value are displayed. Furthermore, in the remaining number of days display field 427, "59 days", which is the remaining number of operating days 124 corresponding to the cyan toner container 12, is displayed.

In a display area 444, "recovered toner container", which is an item name corresponding to the recovered toner container 2, is displayed in the item display field 424, and "WT-XXX", which is a model number name 122 corresponding to the recovered toner container 2, is displayed in the model number display field 425. Moreover, in the state display field 426, a value "90%" calculated by subtracting 10%, which is the degree of consumption 123 corresponding to the recovered toner container 2, from 100% and an indicator indicating the calculated value are displayed. Furthermore, in the remaining number of days display field 427, since the value (371 days) of the remaining number of operating days 124 corresponding to the recovered toner container 2 exceeds 364 days serving as a threshold value, "one year or more" is displayed.

Additionally, in the toner/recovered toner degree of consumption/model number check screen 402, a toner/recovered toner key 422 and a replacement part key 423 are displayed, and the toner/recovered toner key 422 is in a state of being highlighted. Then, the replacement part key 423 is a key used to make a transition to a screen for displaying lifetimes of consumable parts of the type in which the image forming operation does not stop in response to the time for replacement being reached. Moreover, in response to an "others" key being pressed, the image forming apparatus 100 displays a screen for checking other consumable parts. Furthermore, the other consumable parts include, for example, staples, which are used in a post-processing apparatus connected to the image forming apparatus 100.

In a state in which the toner/recovered toner degree of consumption/model number check screen 402 is displayed, in response to the replacement part key 423 being pressed by the user, the CPU 101 displays a replacement part degree of consumption/model number check screen 403 on the operation unit 113.

In the replacement part degree of consumption/model number check screen 403, an OK key 431, an item display field 434, a model number display field 435, a state display field 436, and a remaining number of days display field 437 are displayed, and the OK key 431 is a key used to make a transition to the status check/stop screen 401.

The consumable parts which are displayed in the screen 403 are consumable parts of the type in which the image forming operation does not stop in response to the time for replacement being reached. Accordingly, display control which is performed with respect to the state display field 436 and the remaining number of days display field 437 differs slightly from the above-described display control performed in the screen 402. Furthermore, processing for rounding the remaining number of operating days to be displayed as one year or more is similar to that in the display control described with reference to the screen 402. On the other hand, the consumable parts which are displayed in the screen 403 are able to be used for image formation even when the time for replacement is reached. With regard to these consumable parts, since the degree of consumption may in some cases exceed 100%, in a case where the lifetime falls below a predetermined threshold value (for example, 1%), the lifetime is configured to be replaced by the predetermined threshold value (for example, 1%) to be displayed. Moreover, to inform the user of recommending a replacement in a case where the remaining number of operating days is zero, the CPU 101 performs control to display "time for replacement" in the remaining number of days field 437.

The CPU 101 displays display contents corresponding to the photosensitive drums 6 of the respective colors, the fixing unit 55, and the document feeding roller 204 in display areas 450 to 455 based on the consumable part lifetime management table 120 illustrated in FIG. 3. Next, contents in the respective display areas are described.

In a display area 450, an illustration of "K", which corresponds to the black photosensitive drum 6, and an item name "drum unit" thereof are displayed in an item display field 434, and "NPG-ZZZ", which is a model number name 122 corresponding to the black photosensitive drum 6, is displayed in a model number display field 435. Moreover, in a state display field 436, a value "8%" calculated by subtracting 92%, which is the degree of consumption 123 corresponding to the black photosensitive drum 6, from 100% and an indicator indicating the calculated value are displayed. Furthermore, in a remaining number of days display field 437, "13 days", which is the remaining number of operating days 124 corresponding to the black photosensitive drum 6, is displayed.

In a display area 451, an illustration of "Y", which corresponds to the yellow photosensitive drum 6, and an item name "drum unit" thereof are displayed in the item display field 434, and "NPG-ZZZ", which is a model number name 122 corresponding to the yellow photosensitive drum 6, is displayed in the model number display field 435. Moreover, in the state display field 436, a value "47%" calculated by subtracting 53%, which is the degree of consumption 123 corresponding to the yellow photosensitive drum 6, from 100% and an indicator indicating the calculated value are displayed. Furthermore, in the remaining number of days display field 437, "86 days", which is the remaining number of operating days 124 corresponding to the yellow photosensitive drum 6, is displayed.

In a display area 452, an illustration of "M", which corresponds to the magenta photosensitive drum 6, and an item name "drum unit" thereof are displayed in the item display field 434, and "NPG-ZZZ", which is a model number name 122 corresponding to the magenta photosensitive drum 6, is displayed in the model number display field 435. Moreover, in the state display field 436, a value "24%" calculated by subtracting 76%, which is the degree of consumption 123 corresponding to the magenta photosensitive drum 6, from 100% and an indicator indicating the calculated value are displayed. Furthermore, in the remaining number of days display field 437, "41 days", which is the remaining number of operating days 124 corresponding to the magenta photosensitive drum 6, is displayed.

In a display area 453, an illustration of "C", which corresponds to the cyan photosensitive drum 6, and an item name "drum unit" thereof are displayed in the item display field 434, and "NPG-ZZZ", which is a model number name 122 corresponding to the cyan photosensitive drum 6, is displayed in the model number display field 435. Moreover, in the state display field 436, a value "36%" calculated by subtracting 64%, which is the degree of consumption 123 corresponding to the cyan photosensitive drum 6, from 100% and an indicator indicating the calculated value are displayed. Furthermore, in the remaining number of days display field 437, "59 days", which is the remaining number of operating days 124 corresponding to the cyan photosensitive drum 6, is displayed.

In a display area 454, "fixing unit", which is an item name corresponding to the fixing unit 55, is displayed in the item display field 434, and "FX-XXX", which is a model number name 122 corresponding to the fixing unit 55, is displayed in the model number display field 435. Moreover, in the state display field 436, a value "98%" calculated by subtracting 2%, which is the degree of consumption 123 corresponding to the fixing unit 55, from 100% and an indicator indicating the calculated value are displayed. Furthermore, in the remaining number of days display field 437, since the value (432 days) of the remaining number of operating days 124 corresponding to the fixing unit 55 exceeds 364 days serving as a threshold value, "one year or more" is displayed.

In a display area 455, "ADF maintenance kit", which is an item name corresponding to the document feeding roller 204, is displayed in the item display field 434, and "DR-XXX", which is a model number name 122 corresponding to the document feeding roller 204, is displayed in the model number display field 435. Moreover, in the state display field 436, since a value "−17%" calculated by subtracting 117%, which is the degree of consumption 123 corresponding to the document feeding roller 204, from 100% falls below 1% serving as a threshold value, "1%" is displayed, and an indicator indicating the displayed value is displayed. Furthermore, in the remaining number of days display field 437, since the remaining number of operating days 124 corresponding to the document feeding roller 204 has reached zero days, "time for replacement" is displayed.

Moreover, in the replacement part degree of consumption/model number check screen 403, a toner/recovered toner key 432 and a replacement part key 433 are displayed, and the replacement part key 433 is in a state of being highlighted. Then, the toner/recovered toner key 432 is a key used to make a transition to a screen for displaying lifetimes of consumable parts of the type in which the image forming operation stops in response to the time for replacement being reached.

In a state in which the replacement part degree of consumption/model number check screen 403 is displayed, in response to the toner/recovered toner key 432 being pressed by the user, the CPU 101 displays the toner/recovered toner degree of consumption/model number check screen 402 on the operation unit 113.

Next, control which is performed in a case where the service engineer registers, as instrument setting, whether to display lifetimes of consumable parts on the operation unit 113 is described with reference to FIGS. 5A, 5B, 5C, and 5D.

FIGS. 5A to 5D illustrate a transition example of service mode screens, each of which is displayed on the operation unit 113. The screen 501 represents an example of a menu screen for the service mode. The screen 502 represents an example of a setting change screen. Moreover, the screen 503 represents another example of the setting change screen. The screen 504 represents another example of the menu screen for the service mode.

When detecting an operation performed by the service engineer to make a transition to the service mode, the CPU 101 displays the menu screen 501 for the service mode on the operation unit 113. In the service mode menu screen 501, a value "change not performed" indicating that setting for switching display contents indicated in the toner/recovered toner degree of consumption/model number check screen 402 or the replacement part degree of consumption/model number check screen 403 has not been performed is displayed in information 511. Moreover, a display setting menu 510 of the degree of consumption/model number check screen is a menu used to make a transition to the setting change screen.

When the CPU 101 detects that the display setting menu 510 of the degree of consumption/model number check screen has been pressed, the CPU 101 displays the setting change screen 502 on the operation unit 113. In the setting change screen 502, an OFF key 521 and an ON key 520, which are related to displaying of toner containers, are displayed. In the screen 502, highlighting the ON key 520 indicates that setting for displaying the state display field 426 and the remaining number of days display field 427 in the display areas 440 to 443 illustrated in FIG. 4B is currently selected. In other words, this indicates that the current display setting of the state display field 426 and the remaining number of days display field 427 corresponding to the lifetimes of the toner containers 12 of the respective colors is ON. Similarly, in the setting change screen 502, an OFF key 523 and an ON key 522 for the recovered toner container are displayed. In the screen 502, highlighting the ON key 522 indicates that setting for displaying the state display field 426 and the remaining number of days display field 427 in the display area 444 illustrated in FIG. 4B is currently selected. In other words, this indicates that the current display setting of the state display field 426 and the remaining number of days display field 427 corresponding to the lifetime of the recovered toner container 2 is ON.

Moreover, in the setting change screen 502, an OFF key 525 and an ON key 524 for the drum unit are displayed. In the screen 502, highlighting the ON key 524 indicates that setting for displaying the display areas 450 to 453 illustrated in FIG. 4C is currently set. In other words, this indicates that the current display setting of the display areas 450 to 453 corresponding to the photosensitive drums 6 of the respective colors is ON. Similarly, in the setting change screen 502, an OFF key 527 and an ON key 526 for the fixing unit are displayed. In the screen 502, highlighting the ON key 526 indicates that setting for displaying the display area 454 illustrated in FIG. 4C is currently set. In other words, this indicates that the current display setting of the display area 454 corresponding to the fixing unit 55 is ON.

Additionally, in the setting change screen 502, an OFF key 529 and an ON key 528 for the ADF maintenance kit are displayed. In the screen 502, highlighting the ON key 528 indicates that setting for displaying the display area 455 illustrated in FIG. 4C is currently set. In other words, this indicates that the current display setting of the display area 455 corresponding to the document feeding roller 204 is ON.

The user can switch setting related to displaying by selecting applicable keys. Here, as an example, a case where the OFF key 521 for the toner container, the OFF key 523 for the recovered toner container, and the OFF key 527 for the fixing unit have been selected is described. The setting change screen 503 represents an example of a screen which is displayed in a case where the OFF key 521 for the toner container, the OFF key 523 for the recovered toner container, and the OFF key 527 for the fixing unit have been selected.

In the setting change screen 503, highlighting an OFF key 530 for the toner container and an OFF key 531 for the recovered toner container indicates that setting for hiding the state display field 426 and the remaining number of days display field 427 in the display regions 440 to 444 illustrated in FIG. 4B has been selected. Moreover, highlighting an OFF key 532 for the fixing unit indicates that setting for hiding the display area 454 illustrated in FIG. 4C has been selected.

In a state in which the setting change screen 503 is displayed, in response to the OK key 533 being pressed by the service engineer, the CPU 101 displays a service mode menu screen 504 on the operation unit 113. Here, the CPU 101 sets the values of flags respectively representing whether to display the lifetimes of the toner containers, the lifetime of the recovered toner container, and the lifetime of the fixing unit to "FALSE" (invalid). Furthermore, the values of the respective flags are stored in the RAM 104 or the storage 111. In the service mode menu screen 504, a value "change performed" indicating that setting for switching display contents indicated in the toner/recovered toner degree of consumption/model number check screen 402 or the replacement part degree of consumption/model number check screen 403 has been performed is displayed in information 540.

Furthermore, while, in the present embodiment, an example of a case where the service engineer registers, as instrument setting, whether to display lifetimes of consumable parts on the operation unit 113 has been described with reference to the service mode screen, which is displayed on the operation unit 113, the present embodiment is not limited to this. For example, a configuration in which the service engineer can register, as instrument setting, whether to display lifetimes of consumable parts on the operation unit 113, via a setting screen displayed on an information processing apparatus (omitted from illustration) connected to the image forming apparatus 100 via a network in such a manner as to be able to communicate therewith can be employed. Moreover, considering the case of not displaying lifetimes of consumable parts on the operation unit 113, a configuration in which, to allow checking the lifetimes of consumable parts via the information processing apparatus, information equivalent to the consumable part lifetime management table 120 illustrated in FIG. 3 is periodically transmitted from the image forming apparatus 100 to the information processing apparatus can also be employed.

Moreover, the image forming apparatus 100 can display, in a list, detailed information about lifetimes of a plurality of consumable parts as a screen for the service mode provided to the service engineer. In this case, the CPU 101 displays, on the operation unit 113, the values of the degree of consumption 123 and the remaining number of operating days 124 stored in the consumable part lifetime management table 120 illustrated in FIG. 3 without processing such values, as the detailed information about lifetimes of a plurality of consumable parts. The service engineer can call up such a service mode screen, thus being able to check more detailed lifetimes as compared with the lifetimes of consumable parts which are displayed in the toner/recovered toner degree of consumption/model number check screen 402 and the replacement part degree of consumption/model number check screen 403.

Next, specific display contents of the toner/recovered toner degree of consumption/model number check screen and the replacement part degree of consumption/model number check screen which are displayed in a case where the service engineer registers, as instrument setting, whether to display lifetimes of consumable parts in the contents illustrated in FIGS. 5A to 5D are described with reference to FIGS. 6A to 6C.

Figure 6A:
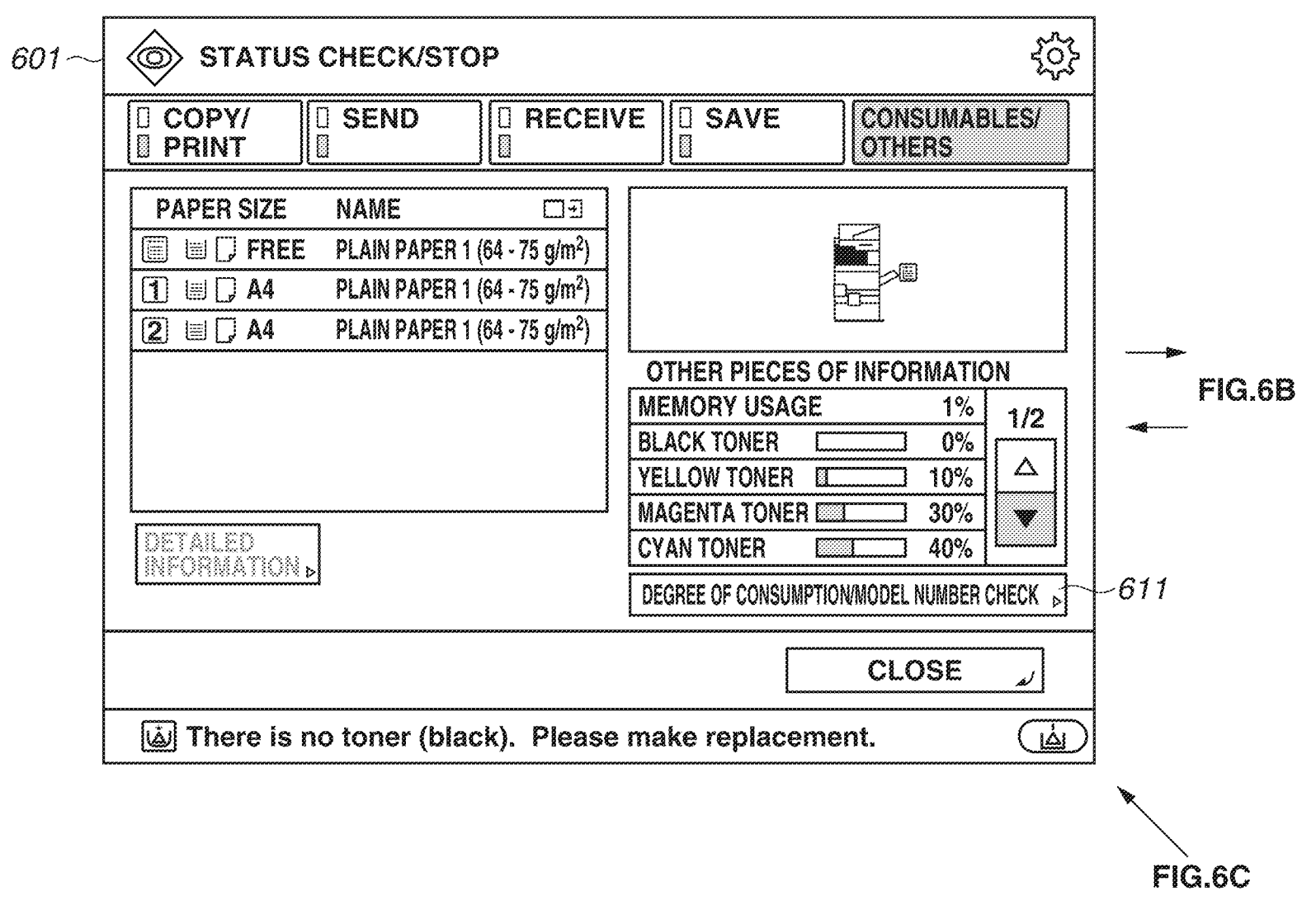

FIGS. 6A to 6C illustrate a transition example of screens for displaying lifetimes of consumable parts, each of which is displayed on the operation unit 113. The screen 601 represents an example of a status check/stop screen. The screen 602 represents an example of a screen for displaying lifetimes of consumable parts of the type in which the image forming operation stops in response to the time for replacement being reached. The screen 603 represents an example of a screen for displaying lifetimes of consumable parts of the type in which the image forming operation does not stop in response to the time for replacement being reached.

When detecting that the status check/stop key (omitted from illustration) has been pressed by the user, the CPU 101 displays the status check/stop screen 601 on the operation unit 113. Referring to FIG. 6A, when the CPU 101 detects that a degree of consumption/model number check key 611 has been pressed, the CPU 101 displays the toner/recovered toner degree of consumption/model number check screen 602 on the operation unit 113. In the toner/recovered toner degree of consumption/model number check screen 602, an item display field 624 and a model number display field 625 are displayed. However, in the toner/recovered toner degree of consumption/model number check screen 602, since the lifetime display flag for the toner container and the lifetime display flag for the recovered toner container are set to "FALSE", the CPU 101 does not display the state display field and the remaining number of days field illustrated in FIG. 4B.

In a state in which the toner/recovered toner degree of consumption/model number check screen 602 is displayed, in response to the replacement part 623 being pressed by the user, the CPU 101 displays the replacement part degree of consumption/model number check screen 603 on the operation unit 113. In the replacement part degree of consumption/model number check screen 603, an item display field 634, a model number display field 635, a state display field 636, and a remaining number of days display field 637 are displayed. The CPU 101 displays display contents corresponding to the photosensitive drums 6 of the respective colors and the document feeding roller 204 in the display areas 650 to 654 based on the consumable part lifetime management table 120 illustrated in FIG. 3. In the replacement part degree of consumption/model number check screen 603, since the lifetime display flag for the fixing unit is set to "FALSE", the CPU 101 does not display a display content corresponding to the fixing unit 55.

Figure 8:
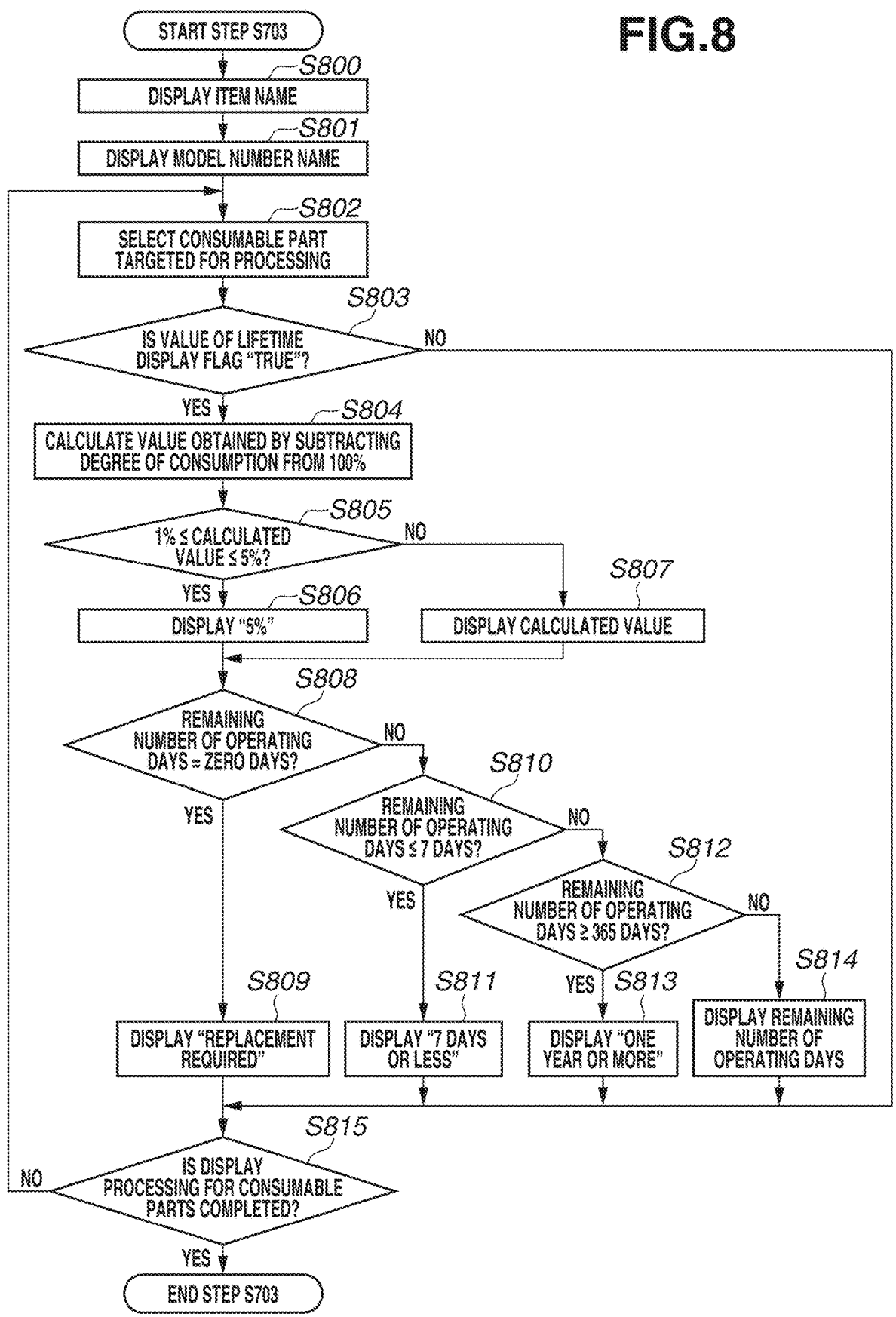
FIG. 8 is a flowchart illustrating an example of display control in the image forming apparatus.
Figure 9:
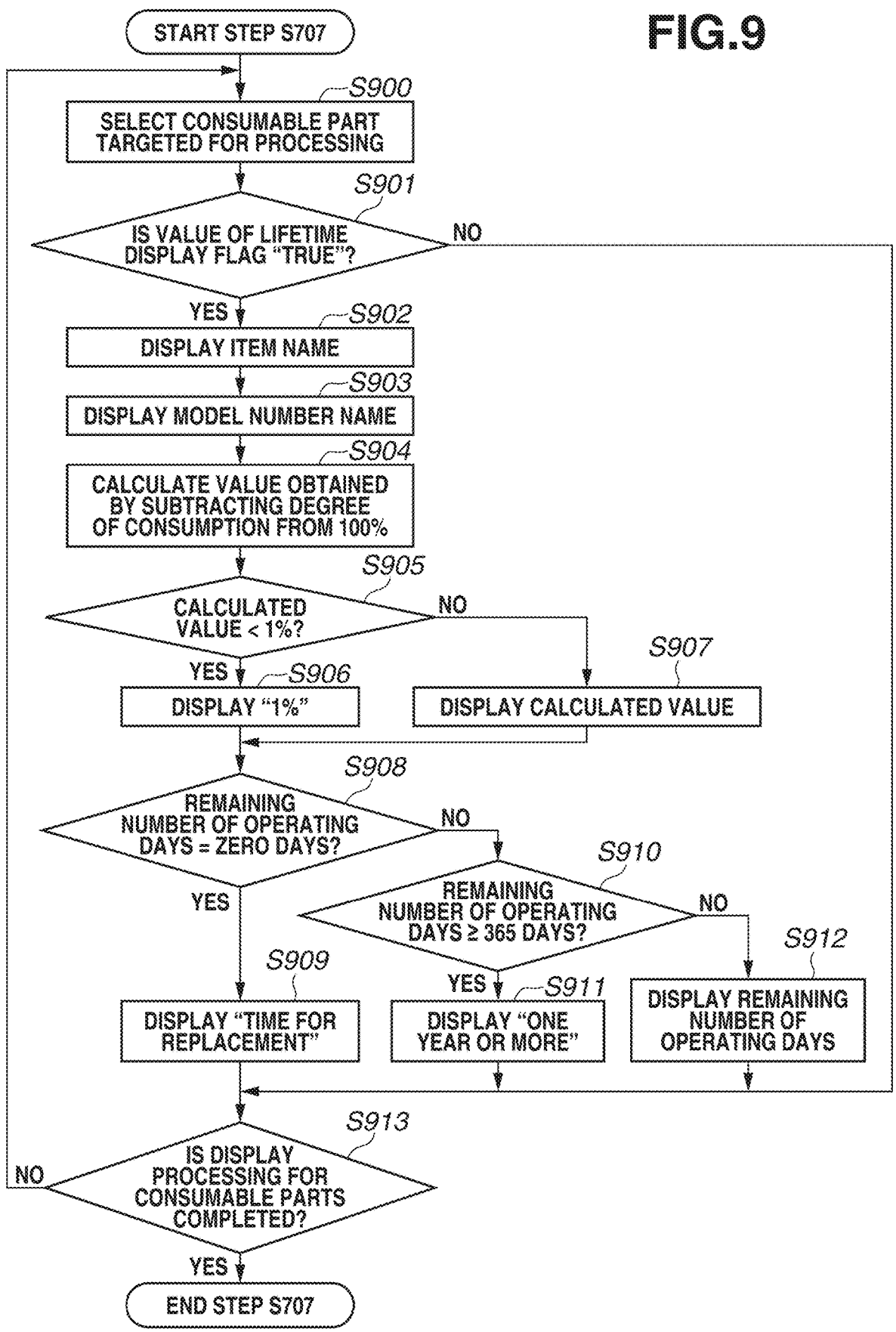
FIG. 9 is a flowchart illustrating an example of display control in the image forming apparatus.

Next, operations of the image forming apparatus 100 related to display control of screens concerning consumable parts described with reference to FIGS. 4A to 4C to FIGS. 6A to 6C are described. FIG. 7, FIG. 8, and FIG. 9 are flowcharts illustrating control of the image forming apparatus 100. Each operation (step) illustrated in FIG. 7 to FIG. 9 is implemented by the CPU 101 reading out a program for implementing each control module stored in the ROM 102 or the storage 111 onto the RAM 104 and executing the program. Furthermore, in the present embodiment, processing related to displaying is assumed to be implemented in cooperation with hardware, such as the operation unit 113. The flowchart of FIG. 7 represents an example of display control performed after the screen 401 for checking the status of the image forming apparatus 100 is displayed on the operation unit 113 of the image forming apparatus 100.

First, in step S701, the CPU 101 determines whether, in a state in which the status check/stop screen 401 illustrated in FIG. 4A is displayed, the degree of consumption/model number check key 411 has been pressed. If it is determined that the degree of consumption/model number check key 411 has been pressed (YES in step S701), the CPU 101 advances the processing to step S702. On the other hand, if it is determined that the degree of consumption model number check key 411 has not been pressed (NO in step S701), the CPU 101 returns the processing to step S701.

In step S702, the CPU 101 refers to the consumable part lifetime management table 120, which is illustrated as an example in FIG. 3, and acquires the model number names, the degrees of consumption, and the remaining numbers of operating days corresponding to the toner containers 12 of the respective colors and the recovered toner container 2. For example, in the case of the yellow toner container, the model number name is NPG-YYY, the degree of consumption is 97%, and the remaining number of operating days is 5 days.

Next, in step S703, the CPU 101 performs processing for generating and displaying a check screen for checking consumable parts of the type in which the image forming operation stops in response to the time for replacement being reached, based on the information acquired in step S702. Specific control is described with reference to the flowchart of FIG. 8.

First, in step S800, the CPU 101 displays item names corresponding to the toner containers 12 of the respective colors and an item name corresponding to the recovered toner container 2 in the item display field 424 of the toner/recovered toner degree of consumption/model number check screen 402. In step S801, the CPU 101 displays the model number name acquired in step S702 in the model number display field 425 of the toner/recovered toner degree of consumption/model number check screen 402. After the display processing for the model number is completed, the CPU 101 advances the processing to step S802.

In step S802, the CPU 101 selects one consumable part targeted for processing from among a plurality of consumable parts acquired in step S702. Hereinafter, in steps S803 to S814, control for displaying items of the state and the remaining number of days corresponding to the consumable part targeted for processing selected in step S802 is described. Processing in steps S803 to S814 is repeatedly performed until display control for all of the consumable parts acquired in step S702 is completed.

In step S803, the CPU 101 refers to the value of the lifetime display flag corresponding to the target consumable part and determines whether the value is "TRUE". If it is determined that the value is "TRUE" (YES in step S803), the CPU 101 advances the processing to step S804. On the other hand, if it is determined that the value is "FALSE" (NO in step S803), the CPU 101 advances the processing to step S815. This processing allows causing the state display field and the remaining number of days display field not to be displayed with respect to a display item the lifetime display flag of which is "FALSE".

In step S804, the CPU 101 calculates a value obtained by subtracting the degree of consumption corresponding to the target consumable part from 100%. In step S805, the CPU 101 determines whether the value calculated in step S804 is within the range of greater than or equal to 1% and less than or equal to 5%. If it is determined that the value calculated in step S804 is within the range of greater than or equal to 1% and less than or equal to 5% (YES in step S804), the CPU 101 advances the processing to step S806. On the other hand, if it is determined that the value calculated in step S804 is not within the range of greater than or equal to 1% and less than or equal to 5% (NO in step S804), the CPU 101 advances the processing to step S807.

In step S806, the CPU 101 displays "5%" and an indicator corresponding to 5% in the state display field 426 of the toner/recovered toner degree of consumption/model number check screen 402. On the other hand, in step S807, the CPU 101 displays the value calculated in step S804 and an indicator corresponding to the calculated value in the state display field 426 of the toner/recovered toner degree of consumption/model number check screen 402.

Next, in step S808, the CPU 101 determines whether the remaining number of operating days corresponding to the target consumable part is zero days. If it is determined that the remaining number of operating days corresponding to the target consumable part is zero days (YES in step S808), the CPU 101 advances the processing to step S809. On the other hand, if it is determined that the remaining number of operating days corresponding to the target consumable part is not zero days (NO in step S808), the CPU 101 advances the processing to step S810.

In step S809, the CPU 101 displays "replacement required" in the remaining number of days display field 427 of the toner/recovered toner degree of consumption/model number check screen 402, and then advances the processing to step S815.

In step S810, the CPU 101 determines whether the remaining number of operating days corresponding to the target consumable part is less than or equal to 7 days. If it is determined that the remaining number of operating days corresponding to the target consumable part is less than or equal to 7 days (YES in step S810), the CPU 101 advances the processing to step S811. On the other hand, if it is determined that the remaining number of operating days corresponding to the target consumable part is not less than or equal to 7 days (NO in step S810), the CPU 101 advances the processing to step S812.

In step S811, the CPU 101 displays "7 days or less" in the remaining number of days display field 427 of the toner/recovered toner degree of consumption/model number check screen 402, and then advances the processing to step S815.

In step S812, the CPU 101 determines whether the remaining number of operating days corresponding to the target consumable part is greater than or equal to 365 days. If it is determined that the remaining number of operating days corresponding to the target consumable part is greater than or equal to 365 days (YES in step S812), the CPU 101 advances the processing to step S813. On the other hand, if it is determined that the remaining number of operating days corresponding to the target consumable part is not greater than or equal to 365 days (NO in step S812), the CPU 101 advances the processing to step S814.

In step S813, the CPU 101 displays "one year or more" in the remaining number of days display field 427 of the toner/recovered toner degree of consumption/model number check screen 402, and then advances the processing to step S815. On the other hand, in step S814, the CPU 101 displays the remaining number of operating days corresponding to the target consumable part n the remaining number of days display field 427 of the toner/recovered toner degree of consumption/model number check screen 402, and then advances the processing to step S815.

Then, in step S815, the CPU 101 determines whether display processing for all of the consumable parts acquired in step S702 is completed. If it is determined that display processing for all of the consumable parts acquired in step S702 is not completed (NO in step S815), the CPU 101 returns the processing to step S802, then performing selection processing and display processing for a next consumable part. On the other hand, if it is determined that display processing for all of the consumable parts acquired in step S702 is completed (YES in step S815), the CPU 101 ends a series of screen generation processing and display processing and advances the processing to step S704 in FIG. 7. Performing a series of processing illustrated in FIG. 8 causes the check screen 402 illustrated as an example in FIG. 4B to be displayed on the operation unit 113. Furthermore, while, in the present embodiment, a case where the CPU 101 generates data to be displayed with a series of processing illustrated in FIG. 8 and updates displaying on the operation unit 113 based on the generated data is illustrated as an example, the present embodiment is not limited to this. For example, the CPU 101 can be configured to generate the overall screen data including various display items with a series of processing and update a screen displayed on the operation unit 113 at the timing when generation of the overall screen data is completed.

Referring back to the description of FIG. 7, in step S704, the CPU 101 determines whether, in a state in which the toner/recovered toner degree of consumption/model number check screen 402 illustrated in FIG. 4B is displayed, the replacement part key 423 has been pressed. If it is determined that the replacement part key 423 has been pressed (YES in step S704), the CPU 101 advances the processing to step S705, and if it is determined that the replacement part key 423 has not been pressed (NO in step S704), the CPU 101 advances the processing to step S706.

In step S705, the CPU 101 refers to the consumable part lifetime management table 120 illustrated in FIG. 3 and acquires the model number names, the degrees of consumption, and the remaining numbers of operating days corresponding to the photosensitive drums 6 of the respective colors, the fixing unit 55, and the document feeding roller 204. For example, in the case of the yellow photosensitive drum, the model number name is NPG-ZZZ, the degree of consumption is 53%, and the remaining number of operating days is 86 days.

In step S706, the CPU 101 determines whether, in a state in which the toner/recovered toner degree of consumption/model number check screen 402 illustrated in FIG. 4B is displayed, the OK key 421 has been pressed.

If, in step S706, it is determined that the OK key 421 has been pressed (YES in step S706), the CPU 101 ends the processing for displaying lifetimes of consumable parts of the type in which the image forming operation stops in response to the time for replacement being reached. On the other hand, if, in step S706, it is determined that the OK key 421 has not been pressed (NO in step S706), the CPU 101 returns the processing to step S704.

Next, in step S707, the CPU 101 performs processing for generating and displaying a check screen for checking consumable parts of the type in which the image forming operation does not stop in response to the time for replacement being reached, based on the information acquired in step S705. Specific control is described with reference to the flowchart of FIG. 9.

In step S900, the CPU 101 selects one consumable part targeted for processing from among a plurality of consumable parts acquired in step S705. Hereinafter, in steps S901 to S912, control for displaying items corresponding to the consumable part targeted for processing selected in step S900 is described. Processing in steps S901 to S912 is repeatedly performed until display control for all of the consumable parts acquired in step S705 is completed.

In step S901, the CPU 101 refers to the value of the lifetime display flag corresponding to the target consumable part and determines whether the value is "TRUE". If it is determined that the value of the lifetime display flag is "TRUE" (YES in step S901), the CPU 101 advances the processing to step S902. On the other hand, if it is determined that the value of the lifetime display flag is "FALSE" (NC) in step S901), the CPU 101 advances the processing to step S913. This processing allows causing a display item the lifetime display flag of which is "FALSE" not to be displayed in the check screen.

Next, in step S902, the CPU 101 displays an item name corresponding to the target consumable part in the item display field 434 of the replacement part degree of consumption/model number check screen 403. In step S903, the CPU 101 displays a model number name corresponding to the target consumable part in the model number display field 435 of the replacement part degree of consumption/model number check screen 403.

In step S904, the CPU 101 calculates a value obtained by subtracting the degree of consumption corresponding to the target consumable part from 100%. In step S905, the CPU 101 determines whether the value calculated in step S904 is less than 1%. If it is determined that the value calculated in step S904 is less than 1% (YES in step S905), the CPU 101 advances the processing to step S906, and, if it is determined that the value calculated in step S904 is not less than 1% (NO in step S905), the CPU 101 advances the processing to step S907.

In step S906, the CPU 101 displays "1%" in the state display field 436 of the replacement part degree of consumption/model number check screen 403. On the other hand, in step S907, the CPU 101 displays the value calculated in step S904 in the state display field 436 of the replacement part degree of consumption/model number check screen 403.

Next, generation and displaying of data to be displayed in the remaining number of days display field are described. In step S908, the CPU 101 determines whether the remaining number of operating days corresponding to the target consumable part is zero days. If it is determined that the remaining number of operating days corresponding to the target consumable part is zero days (YES in step S908), the CPU 101 advances the processing to step S909. On the other hand, if it is determined that the remaining number of operating days corresponding to the target consumable part is not zero days (NO in step S908), the CPU 101 advances the processing to step S910.

In step S909, the CPU 101 displays "time for replacement" in the remaining number of days display field 437 of the replacement part degree of consumption/model number check screen 403, and then advances the processing to step S913.

On the other hand, in step S910, the CPU 101 determines whether the remaining number of operating days corresponding to the target consumable part is greater than or equal to 365 days. If it is determined that the remaining number of operating days corresponding to the target consumable part is greater than or equal to 365 days (YES in step S910), the CPU 101 advances the processing to step S911. On the other hand, if it is determined that the remaining number of operating days corresponding to the target consumable part is not greater than or equal to 365 days (NO in step S910), the CPU 101 advances the processing to step S912.

In step S911, the CPU 101 displays "one year or more" in the remaining number of days display field 437 of the replacement part degree of consumption/model number check screen 403, and then advances the processing to step S913.

In step S912, the CPU 101 displays the remaining number of operating days corresponding to the target consumable part in the remaining number of days display field 437 of the replacement part degree of consumption/model number check screen 403, and then advances the processing to step S913.

In step S913, the CPU 101 determines whether display processing for all of the consumable parts acquired in step S705 is completed. If it is determined that display processing for all of the consumable parts acquired in step S705 is not completed (NO in step S913), the CPU 101 returns the processing to step S900, then performing selection processing and display processing for a next consumable part. On the other hand, if it is determined that display processing for all of the consumable parts acquired in step S705 is completed (YES in step S913), the CPU 101 ends a series of screen generation processing and display processing and advances the processing to step S708 in FIG. 7. Performing a series of processing illustrated in FIG. 9 causes the check screen 403 illustrated as an example in FIG. 4C to be displayed on the operation unit 113. Furthermore, while, in the present embodiment, a case where the CPU 101 generates data to be displayed with a series of processing illustrated in FIG. 9 and updates displaying on the operation unit 113 based on the generated data is illustrated as an example, the present embodiment is not limited to this. For example, the CPU 101 can be configured to generate the overall screen data including various display items with a series of processing and update a screen displayed on the operation unit 113 at the timing when generation of the overall screen data is completed.

Referring back to the description of FIG. 7, in step S708, the CPU 101 determines whether, in a state in which the replacement part degree of consumption/model number check screen 403 is displayed, the toner/recovered toner key 432 has been pressed. If, in step S708, it is determined that the toner/recovered toner key 432 has been pressed (YES in step S708), the CPU 101 returns the processing to step S702. On the other hand, if, in step S708, it is determined that the toner/recovered toner key 432 has not been pressed (NO in step S708), the CPU 101 advances the processing to step S709.

In step S709, the CPU 101 determines whether, in a state in which the replacement part degree of consumption/model number check screen 403 is displayed, the OK key 431 has been pressed. If, in step S709, it is determined that the OK key 431 has been pressed (YES in step S709), the CPU 101 ends the processing for displaying lifetimes of consumable parts of the type in which the image forming operation does not stop in response to the time for replacement being reached. Moreover, the CPU 101 causes the screen displayed on the operation unit 113 to transition to the screen 401 for checking the status of the image forming apparatus 100. On the other hand, if, in step S709, it is determined that the OK key 431 has not been pressed (NO in step S709), the CPU 101 returns the processing to step S708.

The above-described processing allows displaying lifetimes of consumable parts of the type in which the image forming operation does not stop in response to the time for replacement being reached while prioritizing displaying of lifetimes of consumable parts of the type in which the image forming operation stops in response to the time for replacement being reached.

Furthermore, while, in the present embodiment, a case where, in step S702, the CPU 101 refers to the consumable part lifetime management table 120 every time the CPU 101 displays the toner/recovered toner degree of consumption/model number check screen 402 has been described as an example, the timing of reference is not limited to this. Likewise, while a case where, in step S705, the CPU 101 refers to the consumable part lifetime management table 120 every time the CPU 101 displays the replacement part degree of consumption/model number check screen 403 has been described as an example, the timing of reference is not limited to this. For example, the CPU 101 can be configured to acquire information about all of the consumable parts at the timing when a transition from the status check/stop screen 401 to the toner/recovered toner degree of consumption/model number check screen 402 is made. Moreover, the CPU 101 can be configured to, in a state in which the CPU 101 is displaying the toner/recovered toner degree of consumption/model number check screen 402 or the replacement part degree of consumption/model number check screen 403, refer to the consumable part lifetime management table 120 periodically with use of, for example, timer processing and update displaying as appropriate.

As described above, in the present embodiment, in a case where a user input for displaying lifetimes of a plurality of consumable parts has been performed, lifetimes of consumable parts of the type in which the image forming operation stops in response to the time for replacement being reached, such as toner containers and a recovered toner container, can be preferentially displayed to the user. In this case, since a list of the model number names, the states, and the remaining number of operating days corresponding to the toner containers and the recovered toner container is displayed in a screen, a printing operation or an image reading operation can be performed in a planned way while a consumable part close to the end of the lifetime is recognized, and a replacement for the consumable part close to the end of the lifetime can also be ordered. This processing allows preventing the user from overlooking the lifetime of a consumable part of the type in which the image forming operation stops in response to the time for replacement being reached.

Additionally, in the present embodiment, in a case where a value calculated from the degree of consumption of each of toner containers and a recovered toner container is within the range of greater than or equal to 1% and less than or equal to 5%, "5%" is displayed in the state display field of the degree of consumption/model number check screen. Moreover, in a case where the remaining number of operating days of each of toner containers and a recovered toner container is within the range of greater than or equal to one day and less than or equal to 7 days, "seven days or less" is displayed in the remaining number of days display field of the degree of consumption/model number check screen. These processing operations not only allow the user to order a replacement for the consumable part close to the end of the lifetime but also allows preventing the user from replacing a consumable part that is still usable on the way. Moreover, in a case where the estimate of the remaining number of operating days exceeds 364 days, the indication can be rounded and displayed as "one year and more". This display control can be performed in such a way as to consciously narrow down the amount of information about a consumable part which remains unreplaced for a while, thus letting the user to intuitively know that the consumable part will remain unreplaced for a while.

Moreover, in the present embodiment, whether to display the degree of consumption can be switched according to each type of a consumable part. Accordingly, displaying can be appropriately switched according to, for example, the contract style of a maintenance service of the image forming apparatus. Moreover, even in a case where the degree of consumption is not displayed, with regard to a consumable part of the type in which the image forming operation stops in response to the time for replacement being reached, a name and a model number thereof are displayed. With this, even in a case where the setting of not displaying detailed information about lifetimes is performed by the service engineer, the user can be notified of a model number of, for example, a toner container or a recovered toner container, which is supposed to be replaced by the user.

MODIFICATION EXAMPLES

While, in the above-described embodiment, an image forming apparatus which performs printing on a sheet of, for example, paper is illustrated as an example of an image forming apparatus, the present embodiment is not limited to this. For example, the present embodiment can be applied to, for example, a direct to garment (DTG) printer, which performs printing on a textile, such as a garment, to form an image on the textile. Consumable parts of the type in which the image forming operation stops in response to the time for replacement being reached in the DTG printer are, for example, ink containers containing the respective color inks and a recovery container for waste ink. Moreover, consumable parts of the type in which the image forming operation does not stop in response to the time for replacement being reached in the DTG printer are, for example, a print head and a transfer unit which performs thermal pressing after textile printing.

Moreover, for example, the present embodiment can be applied to, for example, a three-dimensional (3D) printer, which is equipped with a container portion containing a consumable material, such as resin or metal, and forms a three-dimensional object using the consumable material. Consumable parts of the type in which the formation of a three-dimensional object stops in response to the time for replacement being reached in the 3D printer are, for example, a container component containing a molding material such as resin or metal, a container component containing a support material for forming, for example, a base, and a container component containing a decorative material for decorating a surface. Moreover, consumable parts of the type in which the formation of a three-dimensional object does not stop in response to the time for replacement being reached in the 3D printer are, for example, a print head and an extrusion nozzle.

Moreover, while, in the above-described embodiment, a case where a screen concerning consumable parts is displayed on the operation unit 113 included in the image forming apparatus 100 has been described as an example, the present embodiment is not limited to this. Screens used to check information about consumable parts, such as those illustrated as an example in FIGS. 4A to 4C, can be provided onto a web browser of, for example, a client personal computer (PC). In this case, a HyperText Transfer Protocol (HTTP) server is operating inside the image forming apparatus 100, and a web page used to perform setting change or status check of the image forming apparatus 100 is provided to the above-mentioned web browser in response to a request from the web browser of the client PC.

Here, examples of the web page which the image forming apparatus 100 provides include a web page for displaying a top page (omitted from illustration), a first web page including information similar to that in the check screen 402 illustrated in FIG. 4B, and a second web page including information similar to that in the check screen 403. The first web page and the second web page are assumed to be generated by performing generation processing similar to the processing illustrated in FIG. 8 and FIG. 9. Moreover, the first web page is configured to further include transition information used for transition to the second web page, and the second web page is configured to further include transition information used for transition to the first web page.

Upon receiving, from the web browser of the client PC, an HTTP request for requesting the first web page, the image forming apparatus 100 returns the first web page as a response to the HTTP request. The web browser of the client PC interprets the received first web page, and displays a screen equivalent to the check screen 402 on the screen of, for example, a display or a touch panel. Moreover, in response to a display item for transition to the second web page being selected via the displayed screen, the client PC transmits an HTTP request for requesting the second web page. Upon receiving the HTTP request for requesting the second web page, the image forming apparatus 100 returns the second web page as a response to the HTTP request, thus causing the client PC to display a screen equivalent to the check screen 403. The above-described configuration allows also providing a screen for checking information about consumable parts to a communication terminal which is able to communicate with the image forming apparatus 100.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-008067 filed Jan. 22, 2018, which is hereby incorporated by reference herein in its entirety.

What is claimed is:

1. An image forming apparatus configured to perform image formation using a plurality of consumable parts, the image forming apparatus comprising:
    a display;
    at least one memory storing instructions; and
    at least one processor configured to execute the instructions to cause the image forming apparatus to perform operations including:
    displaying, on the display, a status check screen for providing remaining amount information related to consumable parts including a storage container containing black toner and storage containers containing each color toner,
    displaying, on the display, a first screen for providing information related to consumable parts including at least (i) the storage container containing the black toner and (ii) a storage container containing used waste toner, wherein displaying includes providing, on the first screen, a remaining period in which each of the consumable parts corresponding to the first screen is usable, and displaying, on the display, a second screen for providing information related to other consumable parts different from the consumable parts corresponding to the first screen, wherein a first display item for displaying the first screen is displayed in the status check screen, and the first screen is displayed on the display in response to the first display item being selected, and wherein a second display item for displaying the second screen is displayed in the first screen, and the second screen is displayed on the display in response to the second display item being selected.

2. The image forming apparatus according to claim 1, wherein, with regard to consumable parts corresponding to the first screen or the second screen, state information is provided as information of each consumable part in each of the first screen and the second screen.

3. The image forming apparatus according to claim 1, wherein, on the second screen, a degree of consumption of a fixing unit is provided as the information related to one of the other consumable parts.

4. A control method for an image forming apparatus having a display and configured to perform image formation using a plurality of consumable parts, the control method comprising:

displaying, on the display, a status check screen for providing remaining amount information related to consumable parts including a storage container containing black toner and storage containers containing each color toner;

displaying, on the display, a first screen for providing information related to consumable parts including at least (i) the storage container containing the black toner and (ii) a storage container containing used waste toner, wherein displaying includes providing, on the first screen, a remaining period in which each of the consumable parts corresponding to the first screen is usable; and displaying, on the display, a second screen for providing information related to other consumable parts different from the consumable parts corresponding to the first screen, wherein a first display item for displaying the first screen is displayed in the status check screen, and the first screen is displayed on the display in response to the first display item being selected, and wherein a second display item for displaying the second screen is displayed in the first screen, and the second screen is displayed on the display in response to the second display item being selected.

* * * * *